United States Patent [19]
Sarnicola

[11] Patent Number: 5,366,375
[45] Date of Patent: Nov. 22, 1994

[54] MOTION SIMULATOR

[76] Inventor: John F. Sarnicola, R.D. 1, Box 379 B, Gratsinger Rd., Binghamton, N.Y. 13903

[21] Appl. No.: 881,511

[22] Filed: May 11, 1992

[51] Int. Cl.⁵ .............................................. G09B 9/00
[52] U.S. Cl. ...................................... 434/37; 434/29; 434/55; 434/58; 472/1
[58] Field of Search ........................ 434/29, 33, 37, 43, 434/45, 55, 58, 62-64, 67-69, 30; 364/578; 244/75 R; 472/1, 3, 14, 16-20, 27-37, 39, 44-47

[56] References Cited

U.S. PATENT DOCUMENTS 4,398,889  8/1983  Lam et al. ............................. 434/45
4,564,356  1/1986  Winfree ................................ 434/29

Primary Examiner—Richard J. Apley
Assistant Examiner—Glenn E. Richman
Attorney, Agent, or Firm—William L. Klima

[57] ABSTRACT

A motion simulator comprising a base support connected to a motion platform by hinged legs. The motion simulator is provided with an actuator for moving the motion platform relative to the base support. Preferably, each leg is defined by a lower leg portion and an upper leg portion with a separate actuator connecting the leg portions for providing actuating legs that also stabilize movement of the motion platform.

17 Claims, 15 Drawing Sheets

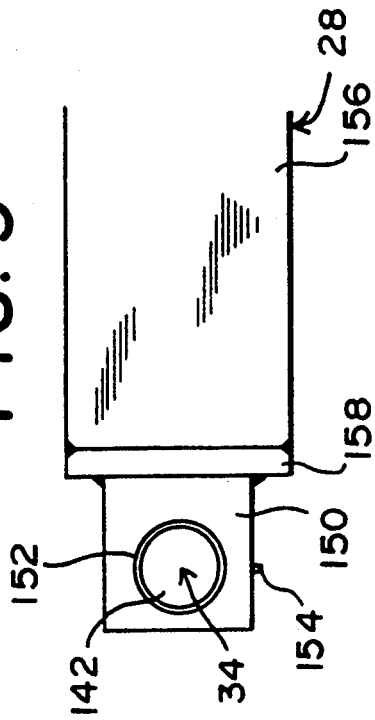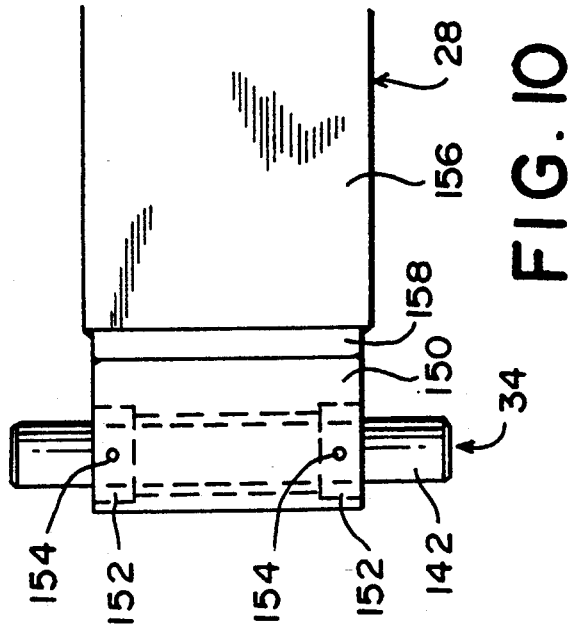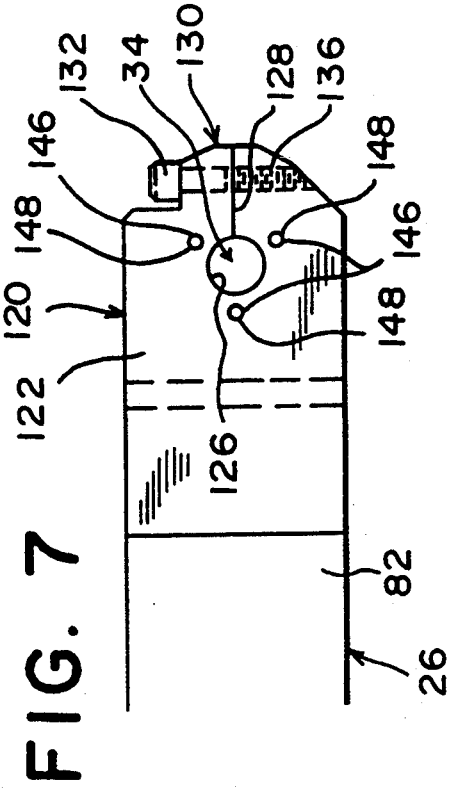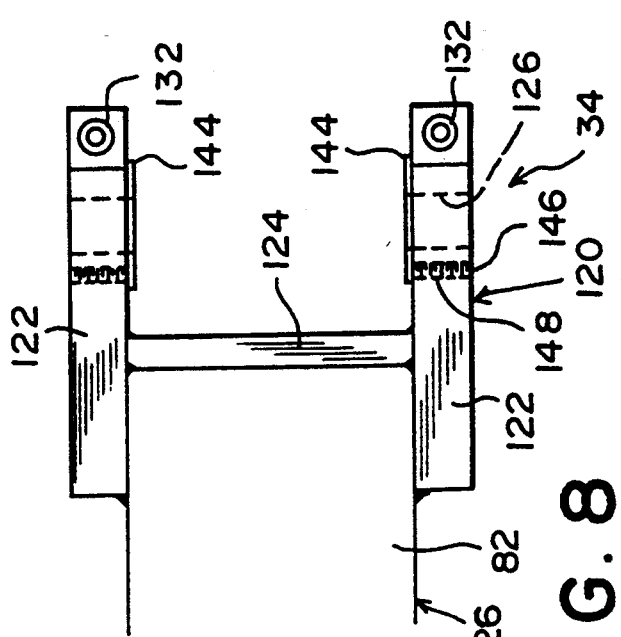

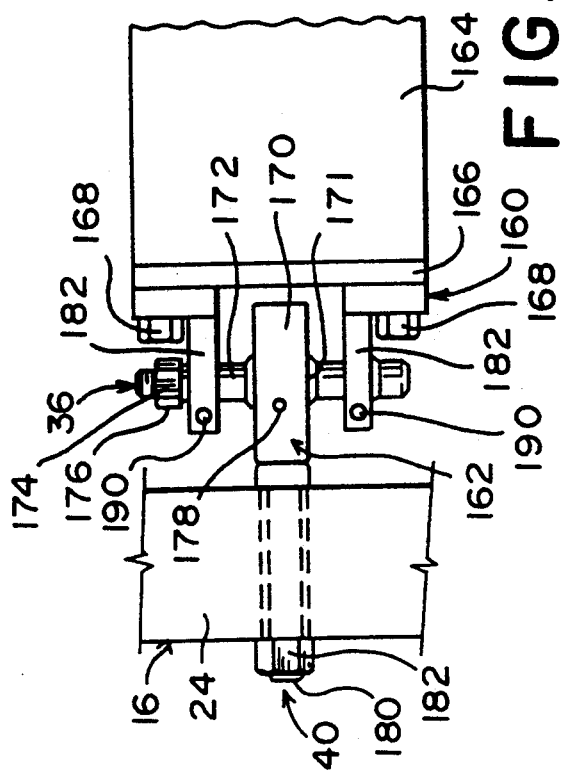
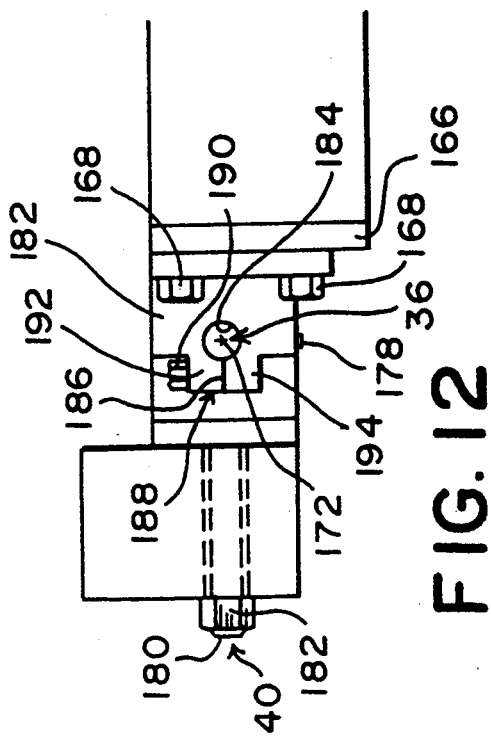
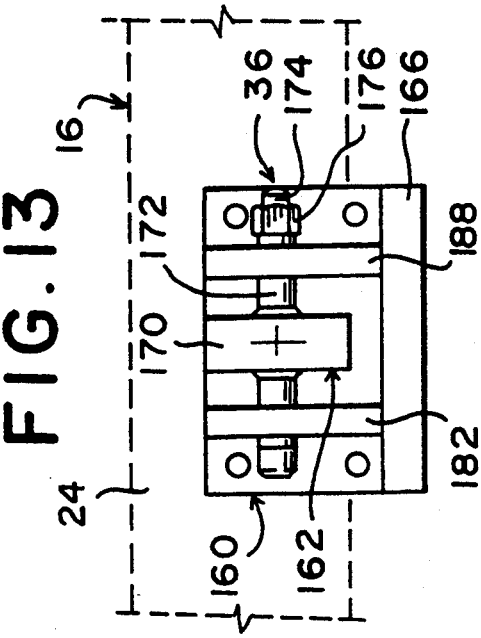
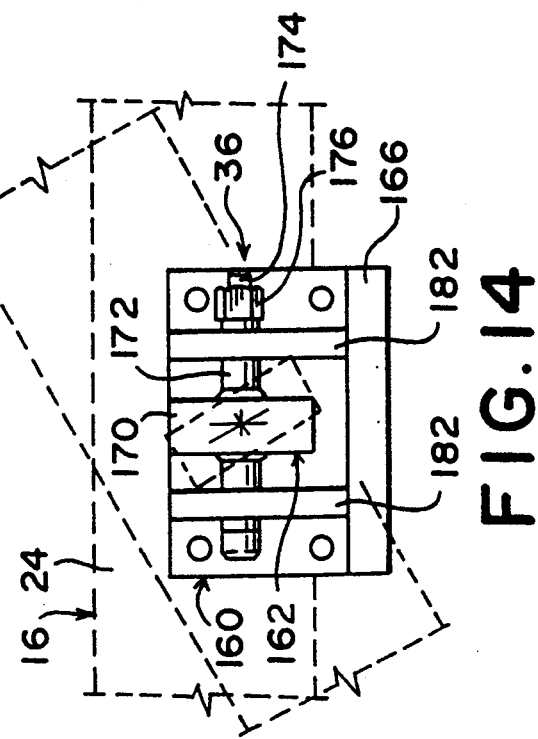

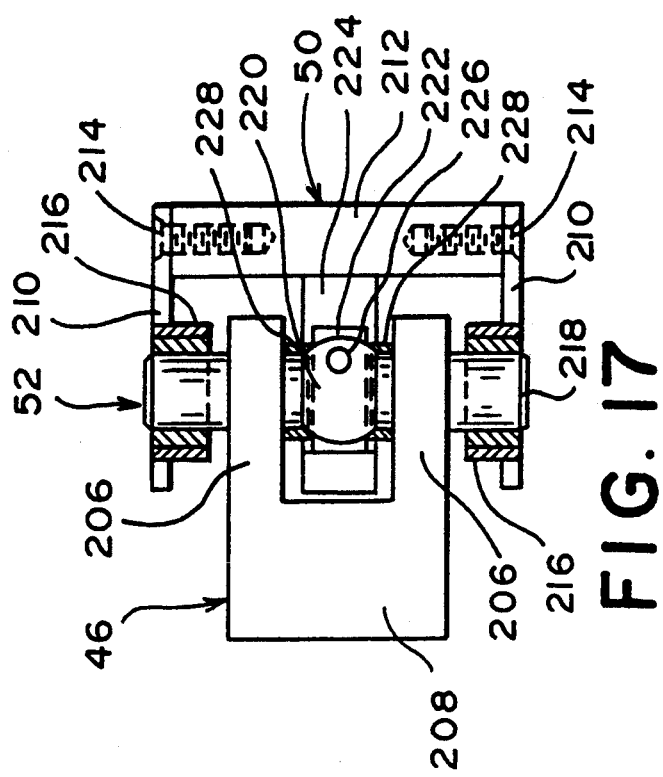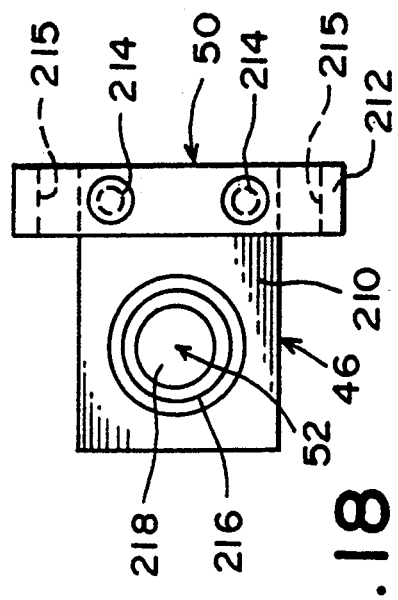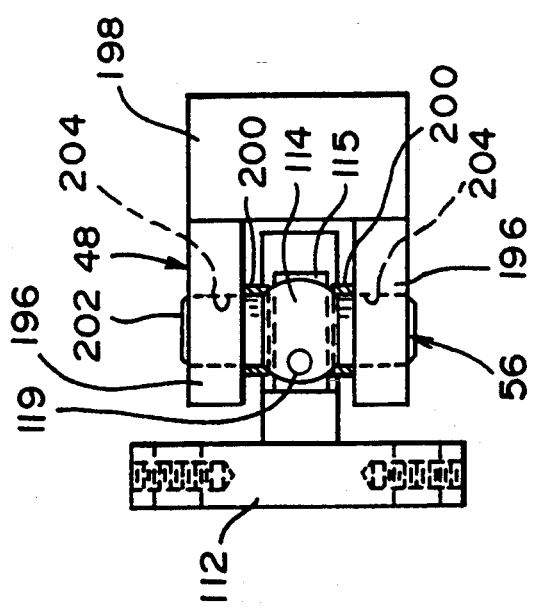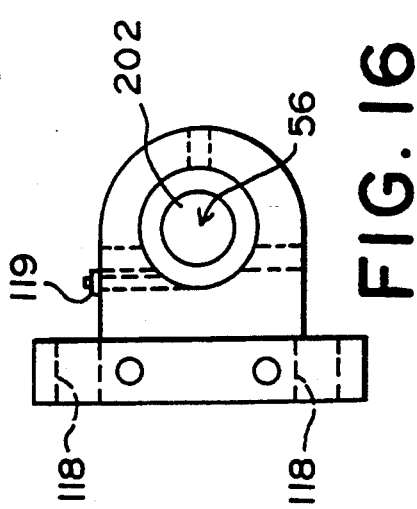

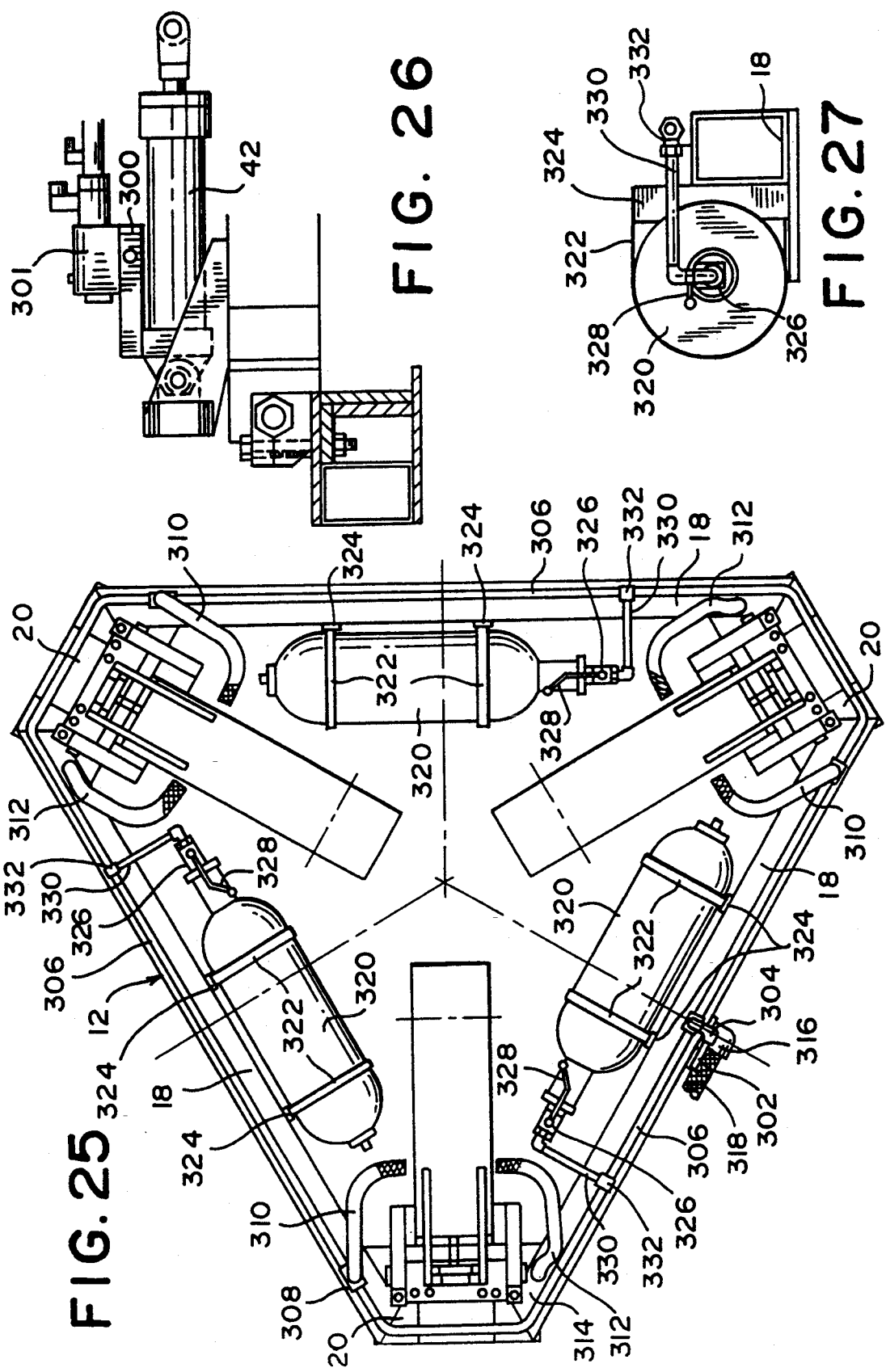

MOTION SIMULATOR

BACKGROUND OF THE INVENTION

1. Field of the Invention

This invention relates to a motion simulating apparatus. More specifically, a motion simulator according to the present invention comprises a base support connected to a motion platform by a plurality of hinged or scissor legs in combination with at least one actuator for moving the motion platform relative the base support.

2. Prior Art

Many different types and designs of motion simulators have been proposed and constructed. The number of degrees of freedom and degrees of motion being simulated place limitations on the structural arrangement of the design.

Historically, the effects of providing realistic simulated motion to supplement other sensory inputs during dynamic training, entertainment and similar applications has been thoroughly documented. Motion is achieved through the use of mechanical means by the use of electro-mechanical systems designed to achieve the particular affect desired depending on the application. All such devices are limited in their ability to simulate motion ideally due primarily to physical excursion limits, mechanical hardware capability, design considerations and computer modeling/hardware limitations.

The basic design goals of motion simulation are to provide: 1) large excursion motion for improved simulation and "wash out" effects; 2) minimal friction in component parts for better feel and stability; 3) minimal backlash (lost motion), also for better feel and stability; 4) compact size in terms of both foot print and minimal height to the motion platform; and 5) minimal weight for motion platform and active actuator components. It needs to be understood that there are only two primary effects experienced by persons riding on a motion platform. They are the forces associated with acceleration and gravity. These two effects are manipulated by the programmer in conjunction with other sensory stimuli (usually visual in nature) to obtain the illusion of true motion. In reality, only actual initial acceleration and simulated sustained acceleration effects are possible. Clearly the intent is to provide improved mechanical designs which allow for improved simulation quality.

All rigid bodies in Euclidean three (3) dimensional space are capable of six (6) degrees of freedom (i.e. three translation (X,Y,Z) and three rotation (Yaw, Pitch, Roll)). Depending on the application, it is necessary to provide a motion simulation device with one or more of these motions in various combinations. Clearly, the more independent motions available, usually the better the simulation.

A true six (6) degree-of-freedom (DOF) system as described b K. L. Cappel (U.S. Pat. No. Re. 27,051 reissued 1971) is the dominant motion simulation design presently in use. Other devices having fewer degrees of motion have been proposed and built, however, the designs have resulted in complex and expensive equipment with limited excursion capability and constrained motion. This constrained motion results in a degree of motion and not a true degree of freedom, and hence, yields compromised motion resulting in a lower quality of simulation.

Although ideal simulation requires six (6) DOF, it is well documented that three (3) degree-of-motion simulation utilizing two (2) rotational motions (Pitch, Roll) and one translational motion (Z-heave) can provide excellent capability for a wide range of physical applications. Ideally, the three (3) axes of motion would be independent, making the system a true three (3) DOF platform, however, motion is often constrained because of kinematic limits resulting non-independent motion. This limitation clearly impacts the degree of fidelity of the simulated motion and hence realism for the passenger.

Previous motion system kinematics have precluded realistic motion due to the severity of constraint placed on a particular axis. Characteristically, attempts to minimize inter-dependency between axes has resulted in non-symmetrical designs having a multitude of special parts, custom designs and manufacturing, and, an excessive degree of complexity resulting in higher initial, operating and maintenance costs.

In addition, for example, previous motion systems have tended to produce false motion cues and hence compromise simulation. Such false cues can, in a training scenario, result in negative training. This is the result of excessive constraints placed on a particular axis of motion where the motions of two axes are not sufficiently uncoupled. The level of non-connectedness is crucial to good simulation regardless of the number of axes of motion.

Ideally, a completely uncoupled system results in a true degrees-of-freedom system. True independent motion is difficult to achieve in simple mechanisms. In the past, three (3) degrees of motion systems (Pitch, Roll, Z) have been strongly coupled kinematic relationships such that movement along one axis resulted in strongly noticeable motion in another axis, to the point where training or simulation effects were nullified or negative. Motion systems of the prior art typically have limited excursion capability, highly coupled motion axes and complex physical construction.

BACKGROUND OF THE INVENTION

An object of the present invention is to provide an improved motion simulator.

Another object of the present invention is to provide a motion simulator comprising a base support connected to a motion platform by three (3) or more hinged or scissor legs in combination with an actuator, preferably multiple actuators, for moving the motion platform relative to the base support.

A further object of the present invention is to provide a motion simulator comprising a base support connected to a motion platform by three (3) or more hinged legs in combination with actuation means associated with the hinged legs for moving the motion platform relative to the base support.

An even further object of the present invention is to provide a motion simulator comprising a base support connected to a motion platform by three (3) or more hinged legs in combination with actuation means exclusively associated with the hinged legs for moving the motion platform relative to the base support.

A still further object of the present invention is to provide a motion platform comprising a base support connected to a motion platform by three (3) or more hinged legs in combination with a separate actuator connected between a lower leg portion and upper leg portion of each leg for moving the motion platform relative to the base support.

An object of the present invention is to provide an improved motion system for training, entertainment, industrial and similar applications.

Another object of the present invention is to provide a motion system operable to supply at least on degree of freedom and two degrees of motion as a base configuration.

A further object of the present invention is to provide accessory motion attachments which independently allow for additional degrees of motion, for example, attachments for individual rotational motion (Yaw), and translational motions (X and Y) to provide additional capability in modular form.

An even further object of the present invention is to provide an improved motion system with greater excursion capability than heretofore possible.

A still further object of the present invention is to provide a motion system that is physically smaller and lighter than others with the same capability; and A even still further object of the present invention is to provide a motion system with improved dynamic capabilities than heretofore has been possible with cascaded systems.

The intent of the present invention is to provide improved simulation capability and performance utilizing a unique kinematic geometry that allows for the elimination of classic cascaded design. As a result, improved performance and operating characteristics can be achieved by reductions in platform weight.

The preferred embodiment of the present invention is an embodiment of simplicity and symmetry of design such as to minimize the above stated negative effects and maximize design criteria. The system design allows for a three (3) axis motion platform having two (2) rotational degrees of motion (Pitch, Roll) and one translational degree of freedom (Z-Heave) where the rotational axes are only lightly coupled.

All motion is obtained by movement of three (3) independent scissor type legs with integral motive actuators, set in an arrangement (preferably symmetrical, although not mandatory) such as to provide vertical thrust, and simultaneously provide lateral stability. Platform stability is maintained through leg structural and bearing design. Specifically, the use of plain spherical bearings in the legs prevents play and allows for fine adjustment.

The motion platform according to the present invention is intended to provide amplified mechanical motion through the use of a scissors arrangement. Several advantages are obtained by this configuration including:

1) shorter and larger diameter actuators allowing lower cost standard equipment where stop tubes are not required to control rod/piston binding in hydraulic systems;

2) optimized actuator crank placement to control effective gearing at rest an full extension excursions;

3) increased actuator diameter allowing for a lower (stick friction/force capacity) ratio with the net result being a lower effective "stiction" (stick friction) force and better operating characteristics from a lower cost actuator, hence, reducing the requirement for special and expensive hydrostatic bearing arrangements to reduce the "turn-around-bump" commonly encountered in motion systems; and 4) pure axial actuator loading due to the scissor leg arrangement taking up all lateral and racking forces, thus, eliminating impressed side loading on the actuator.

The motion platform according to the present invention comprises a base support connected to a motion platform by three (3) or more hinged legs. An actuator or plurality of actuators are provided for moving the motion platform relative to the base. In one embodiment, one or more actuators are provided between the base and motion platform with the legs functioning mainly to stabilize the movement of the platform. In a preferred embodiment, one or more actuators are connected to one or more hinged legs wherein the one or more legs act as leg actuator(s) and stabilizers. In a most preferred embodiment, each leg is provide with at least one separate actuator connected between a lower leg portion and upper leg portion of each leg.

The specific arrangement of the base support, legs and motion platform is important to provide desired motions for particular applications such as a motion platform for a flight simulator, dance or entertainment set, camera support, machine support including implementation as in robotics applications, etc.

The present invention mainly concerns a motion platform having three (3) points of attachment of the hinged legs with the motion platform. The three (3) points of attachment define a plane in which the motion platform exists (i.e. a triangle is defined by the three (3) points which also define the plane). This arrangement provides one (1) degree of freedom in the vertical direction and two (2) degrees of motion defining rolling and tilting motions.

The number of legs can be increased to more than three (3) connection points with the base, however, it is preferred that these legs connect only at three (3) points on the motion platform so as not to place constraints on movement due to the indeterminate nature of the mechanics involved with the movement types and freedom of these modified motion platforms. Alternatively, for example, one hinged leg can be replaced with two separate hinged legs attached at points separated by a minor distance on the base support, and connected together at the same point of connection with the motion platform defining a V-shaped compound leg structure. In another embodiment, all three (3) legs are replaced with the double leg type modification resulting in a six (6) degree of freedom system. In each embodiment, all legs can be independently operated.

The base support can have various configurations and arrangements, however, the base support must be arranged to provide suitable connections with the hinged legs so that the hinged legs are properly oriented and operate properly. Further, the base must be constructed to have sufficient structural strength to withstand the operational loads of the motion platform exerted onto the base support by the hinged legs and/or actuator(s). In a preferred arrangement, a substantially triangular shaped frame is provided with three (3) legs connected to the frame at or near the three (3) apexes of the triangle frame. The frame is fabricated from lengths of rectangular cross-sectional tubing cut to form angled ends. Longer lengths of the tubing define box frame components situated along the sides of the triangular arrangement, and shorter lengths of the tubing define box frame components located at or near the apexes of the triangular arrangement. These box frame components are connected together by mechanical connectors and/or by welding.

In a preferred embodiment, the box frame components are welded together to hermetically seal the inner continuous cavity defined by the inner walls of the tubing components. This arrangement is provided with means for circulating hydraulic fluid through this cavity so that this base arrangement can also serve the function of a tank and heat exchanger for the hydraulic fluid. In one embodiment, the hydraulic fluid from the return line(s) of the hydraulic actuator(s) is fed through such a base arrangement to cool and provide storage for the hydraulic fluid of the hydraulic system.

The base support is preferably provided with three (3) bearing blocks located at or near each apex of the triangular configured base arrangement. The lower ends of the legs pivotally connect to these bearing blocks.

The hinged legs are defined by at least two (2) separate leg portions pivotally connected together. In a preferred arrangement, each leg includes a lower leg portion hingedly connected to an upper leg portion at a knee. The pivotal hinge connection between the lower leg portion and upper leg portion is preferably provided by a bearing arrangement to ensure smooth and accurate movement with little or no play.

The bearing arrangement preferably incorporates a set of plain spherical bearings, the tightness of which can be infinitesimally adjusted by adjusting set screws located on each axle clamp. This same bearing arrangement is preferably used to pivotally connect the lower end of the lower leg portion to a bearing block connected to the base for each leg. Further, this same bearing arrangement is preferably used to pivotally connect the upper end of the lower leg portion of each leg to a bearing block pivotally mounted on the upper leg portion.

The use of the same bearing arrangement for the lower bearing and middle bearing of each leg substantially reduces the overall number of different parts required to construct the apparatus, thus facilitating assembly and maintenance and reducing costs in construction and maintenance (i.e. reducing the number of parts needed to be in stock).

The arrangement of the legs and connections to the base support and motion platform are preferably made such that the knees of the legs move inwardly when the motion platform is lowered towards the base support. This configuration allows the confinement of the path of movement of the leg components within the outer dimensions of the periphery of the base support and motion platform. This configuration results in an operational space saving arrangement and increases the safety of operation of the motion simulator, since the moving parts, especially the legs, are confined within the dimensions of the motion simulator.

The lower leg portion and upper leg portion can be made to be of different lengths depending on the application and gearing requirements. The leg portions must be designed to pivotally connect together at the knee, and pivotally connect to the base support and motion platform, respectively. Further, the leg portions must have sufficient structural strength to withstand operational loads. In one embodiment, the leg portions are constructed with tubular steel sections welded together. This arrangement can be made by cutting the pieces from rectangular cross-sectional steel tubing to form the leg segments, which are welded to fabricate the legs.

In an embodiment wherein a separate hydraulic actuator is provided on each leg, the hydraulic actuator is pivotally connected between the lower leg portion and the upper leg portion. The connection is preferably achieved by a plain spherical bearing arrangement similar to the bearing arrangements of the leg portions, as explained in detail above. A single spherical plain bearing in combination with a set of stabilizers acting on the shaft ends is provided at the connection between the hydraulic actuator with the lower leg portion and upper leg portion.

The motion platform must be configured to connect with the arrangement of the legs extending from the base. In the three (3) leg configuration, the motion platform preferably has a triangular configuration similar to the base. In a preferred construction, the motion platform is constructed from rectangular cross-sectional tubing cut to lengths defining box frame components. Longer box frame components are set along the sides of the triangular configuration and shorter box frame components are set at or near the apexes of the triangular configuration. Preferably, the box frame components are of the same size and length as the box frame components of the base support to reduce the overall number of different parts in the apparatus to reduce related costs.

In the triangular arrangement of the motion platform, the shorter box frame components are fitted with sleeves for accommodating bearing receptors for pivotally connecting three (3) plain spherical bearings to the motion platform. Preferably, a single spherical ball bearing is provided on the end of a threaded shaft from each shorter box and is attached to the upper leg top connection. A shaft clamp arrangement is utilized to secure the spherical ball shaft to the upper leg.

BRIEF DESCRIPTION OF THE DRAWINGS

FIG. 7 is a detailed side elevational view of the lower leg knee axle clamp system;

FIG. 8 is a detailed top plan view of the lower leg knee axle clamp system;

FIG. 9 is a detailed side elevational view of the upper leg knee bearing block system;

FIG. 10 is a detailed top plan view of the upper leg knee bearing block system;

FIG. 11 is a detailed top plan view of the top bearing attachment to the motion platform;

FIG. 12 is a detailed side elevational view of the top bearing attachment;

FIG. 13 is a detailed end view of the top bearing attachment to the motion platform;

FIG. 14 is the same view as FIG. 13, except showing the motion platform in a tilted mode;

FIG. 15 is a detailed top plan view of the lower swivel bracket connection for cylinder attachment;

FIG. 16 is a detailed side elevational view of the lower swivel bracket (cylinder clevis not shown);

FIG. 17 is a detailed top view of an upper swivel bracket for rod clevis attachment with stabilizers;

FIG. 18 is a detailed side elevational view showing the stabilizer attachment to the upper swivel bracket (rod clevis not shown);

FIG. 25 is a top view of the base support showing details of the hydraulic system in combination with the accumulators;

FIG. 26 is a side elevational view of the lower leg and hydraulic cylinder arrangement, and cross-sectional view of the base support;

FIG. 27 is a side elevational view of an accumulator with attachment, and cross-sectional view of the base support;

DETAILED DESCRIPTION OF PREFERRED EMBODIMENTS

Figure 1:
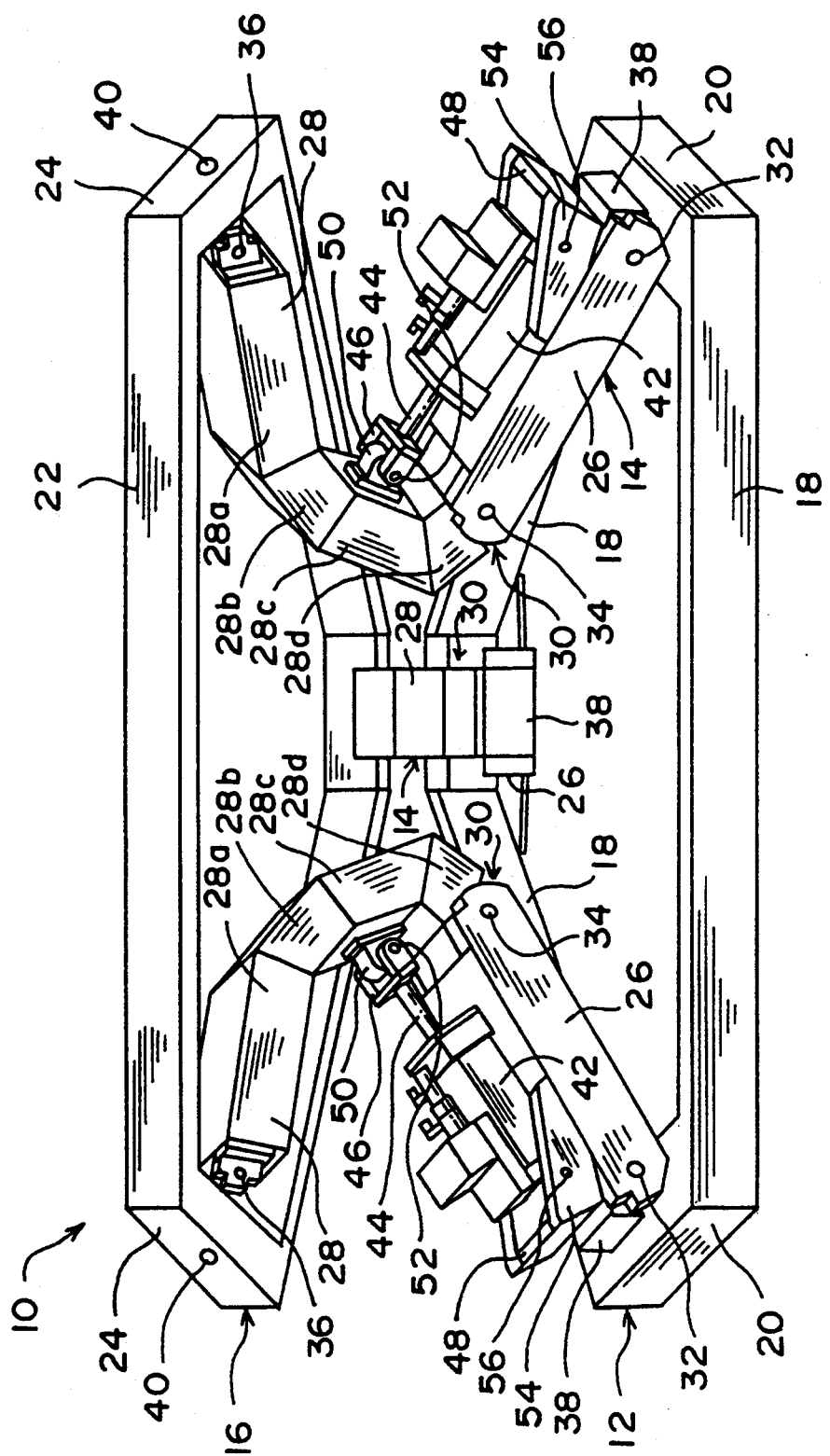
FIG. 1 is a front perspective view of an apparatus according to the present invention.

A motion simulating apparatus 10 according to the present invention is constructed of a plurality of components assembled together, as shown in FIG. 1. The motion simulating apparatus 10 is shown disassembled in FIG. 2 for the purpose of illustrating the separate components thereof.

The motion simulation apparatus 10 comprises a base support 12 connected by legs 14 to a motion platform 16. The base support 12 can have a variety of different configurations depending on the type of use. Each configuration must have sufficient structural strength to withstand operational loads, such as for use with a flight simulator, acting stage, tool support, etc., and the leg connections must be compatible with the number and arrangement of the legs.

In order to provide a motion platform with three (3) degrees of motion, three (3) legs must be provided. Preferably, the three (3) legs are equally spaced, however asymmetrical arrangements are possible, about the perimeter of the base support 12 and motion platform 16. If additional degrees of motion are required, additional numbers of legs greater than three (3) can be provided. Specifically, if motion about any axis added is independent from all other motion, motion about that axis is considered a degree of freedom. Further, additional degrees of motion/freedom can be added in other ways as described below.

The configuration of the base support 12 must allow for pivotal connection of the legs 14 in a correct orientation for proper operation of the legs 14. For example, the base support 12 can be embodied in the form of a tubular collar or frame having a triangular configuration, as shown in FIG. 1. In this particular embodiment, three (3) legs are implemented so that a triangular configuration is required for setting the legs at proper spaced apart distances and operational orientations to allow for the proper operation of the legs of the motion simulating apparatus. More specifically, the legs are spaced and oriented by the particular connection arrangement of the legs 14 with the base support 12 and platform 16. In the triangular configuration, the legs are set for movement in planes that bisect the three angles of the triangular base 12 and triangular motion platform 16.

The tubular collar base support 12 can be constructed of rectangular cross-sectional metal tubing to form box frame components 18 assembled together at their ends, for example, by welding and/or mechanical connectors. In the embodiment shown in FIG. 1, the box frame components 18 are connected together with box connector components 20, for example, also fabricated of rectangular cross-sectional tubing. The box connector components 20 can be welded and/or mechanically coupled to the box frame components 18 to form a unitary structure. With this arrangement, the tubular collar base support 12 can also serve the additional purpose of acting as a tank/heat exchanger for the hydraulic fluid of the hydraulic actuator system to be described in detail below.

The motion platform 16 can also be embodied in various forms. The motion platform 16 must be configured to provide suitably spaced apart and oriented connections for the legs 14 compatible with the particular arrangement of the base support 12. In the embodiment shown in FIG. 1, the platform 16 is embodied in the form of a tubular collar or frame connected to the upper portion of the legs 14. The tubular collar can be constructed of rectangular cross-sectional tubing to form box frame components 22 and box connector components 24 assembled together at their ends, for example, by welding and/or mechanical connectors.

The lower ends of the legs 14 are pivotably connected to the base support 12, and the upper ends of the legs 14 are pivotably connected to the motion platform 16. These pivotal connections will be described in greater detail below.

In the preferred embodiment, the legs 14 are defined by lower leg portions 26 and upper leg portion 28 pivotally connected at hinged knees 30. The details of the structure of the pivotal connection at the hinged knee 32 will be described in greater detail below.

In another embodiment, one or more of the individual legs 14 can be replaced with multiple separate legs connecting at substantially a single point on both the base support 12 and the motion platform 16. A slight modification of this embodiment would provide two (2) connections of the leg subassemblies at slightly set apart positions on the base support 12 with a single connection on the motion platform 16 to provide a V-shaped hinged leg structure to increase the number of degrees of motion of the motion platform shown in FIG. 1, from three (3) degrees of motion/freedom to four (4), five (5) or six (6) degrees of motion/freedom.

The legs 14 are preferably configured so that the hinged knees 30 move inwardly when the lower leg portions 26 and upper leg portions 28 are brought together by operation of the actuators, for example, to lower the motion platform. In this arrangement, the path of movement of the legs 14 is confined by the outer perimeter dimensions of the base support 12 and motion platform 16. This has the advantage of an operational space saving arrangement during use and provides additional safety during operation wherein the paths of movement of the leg portions 26 and 28 are effectively confined within the apparatus, preventing moving contact with an individual operating or working about the apparatus during operation.

The leg portions 26 and 28 must be constructed and designed structurally to withstand operational loads. Means must be provided for pivotably connecting the leg portions 26 and 28 together at hinged knees 30, and for pivotably connecting the leg portions 26 and 28, respectively, to the base support 12 and motion platform 16.

In the particular embodiment shown in FIG. 1, the lower leg portions 26 are made from lengths of rectangular cross-sectional tubing. The upper leg portions 28 are made of multiple tubing sections 28a, 28b, 28c and 28d assembled together, preferably by welding, to form unitary upper legs 28. Further, the multiple tubing sections have angled ends, as shown in FIG. 1, to provide upper leg portions 28 each having a curved or bent configuration.

A lower pivot connection 32 is provided at the bottom of the lower leg portion 26, a middle pivot connection 34 is provided at the hinged knee 30, and an upper pivot connection 36 is provided at the top of the upper leg portion 28 of each leg 14. The pivot connections 32, 34 and 36 are preferably defined by bearing arrangements, and such bearing arrangements will be described in detail below.

The base support 12 is provided with base bearing blocks 38 cooperating with the lower pivot connections 32 of the legs 14. The base bearing blocks 38 are mounted stationary on the base support 12. The motion platform 16 is connected to the legs 14 by upper pivot connections 40.

In a preferred embodiment, the legs 14 are provided with separate actuators. Preferably, the legs 14 are each equipped with hydraulic piston/cylinder type actuators 42. However, it is anticipated that the hydraulic actuators 42 may be replaced with electric actuators. Alternatively, each leg 14 can be provided with a plurality of actuators.

In another embodiment, one or more actuators are connected at various points between the base support 12 and the motion platform 16 with the legs 14 acting as mechanical stabilizers. In a further embodiment, the actuators are connected to the leg portions 26 and 28 from either or both the base support 12 and motion platform 16 to actuate leg portions 26 and 28. In other embodiments, a combination of these actuation methods can be applied.

In the embodiment shown in FIG. 1, the hydraulic actuators 42 are connected to the leg portions 26 and 28 of the legs 14. More specifically, each hydraulic actuator 42 is constructed with a piston rod 44 having a rod end clevis 46, and a cylinder end clevis 48. The upper leg portions 28 of the legs 14 are each provided with an upper swivel bracket 50 pivotably connected by pivot connection 52 to the rod end clevis 46 of the hydraulic actuator 42. The lower leg portions of the legs 14 are each provided with a lower bracket 54 pivotably connected by a pivot connection 56 to the cylinder end clevis 48 of the hydraulic actuator 42. The details of these connections will be described in greater detail below.

In the embodiment shown in FIG. 1, the base support 12 is typically supported or mounted on a stationary object such as a floor or other horizontal support structure of a building. The motion platform 16 is considered live, and is moved relative to the stationary base support 12. In another application, both the base support 12 and motion platform 16 would be attached to moveable objects, for example, in a robotics application. In such an application, the base 12 may be attached to a translating or rotating object and the motion platform is moved relative to the translating/rotating object.

Details of the lower pivot connection 32, are shown in FIGS. 3, 4, 5 and 6. The lower pivot connection 32 comprises a bearing arrangement defined by bearings 60 provided in base bearing block 38. The bearings 60 support axle 62 for substantially frictionless rotation. The base bearing block 38 is provided with grease zerk fittings 64 for lubricating the bearings 60.

Figure 3:
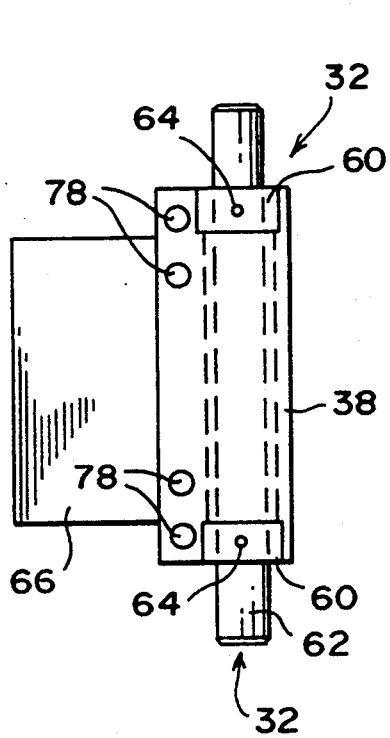
FIG. 3 is a detailed top view of a portion of the lower pivot connection of the lower leg portion.
Figure 4:
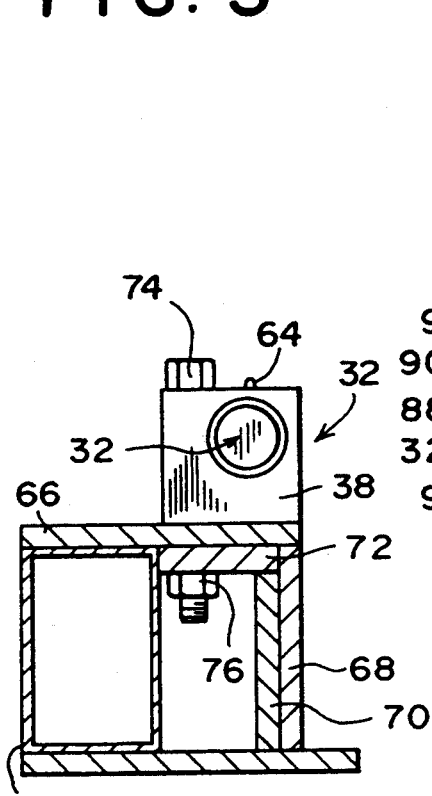
FIG. 4 is a side elevational view of the lower bearing block, and cross-sectional view of the base support.

The base bearing block 38 is connected to the base support 12 by the arrangement shown in FIG. 4. Specifically, the box connector component 20 of the base support 12 is provided with a mounting plate 66, support plate 68, and bracing plates 70 and 72. This arrangement is preferably fabricated of steel plates welded together to form the unitary structure as shown. The base bearing block 38 is connected to the mounting plate 66 and bracing 72 by multiple bolts 74 and nuts 76. As shown in FIG. 3, the base bearing block 38 is provided with four (4) through holes 78 for accommodating four (4) bolts 74 for secure attachment thereof to the mounting plate 66.

Figure 5:
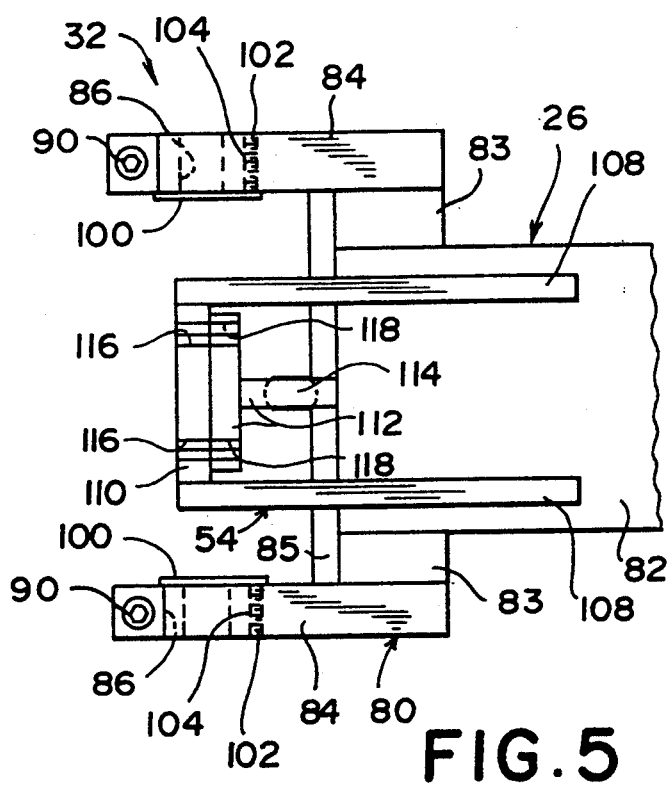
FIG. 5 is a detailed top plan view of the lower leg attachment system.
Figure 6:
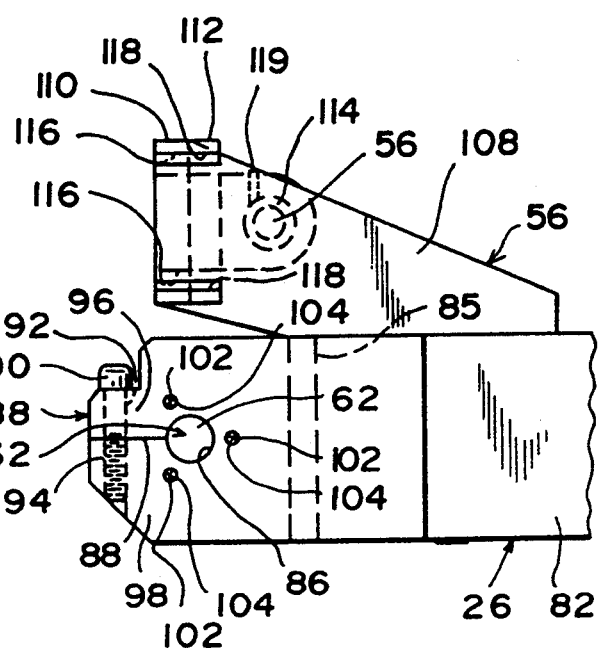
FIG. 6 is a detailed side elevational view of the lower leg attachment system.

The details of the lower end attachment of the lower leg portion 26, is shown in FIGS. 5 and 6. The lower pivot connection 32 includes an axle clamp 80 fitted to the lower end of the lower leg portion 26. The lower leg portion 26 can be fabricated from rectangular cross-sectional tubing 82. The axle clamp 80 is connected to the tubing 82 by spacers 83 welded to the end of the rectangular cross-sectional tubing 82, as shown in FIG. 5.

The axle clamp 80 is defined by a pair of side supports 84, for example, made of steel plate connected together by end plate 85. The end plate 85 is connected to the end of the rectangular cross-sectional tubing such as by welding on four (4) sides thereof.

The side supports 84 are each provided with a hole 86 for receiving axle 62. A slit 88 is provided on each side support 84 extending from an end 88 to the hole 86 to provide a clamping arrangement, as shown in FIG. 6. A threaded bolt 90 extends through a hole 92 in end portion 96 into a threaded hole 94 in end portion 98 allowing end portions 96 and 98 to be drawn together by tightening bolt 90 for clamping the axle 62 securely by the axle clamp 80. Thrust washers 100 are provided for preventing side play between the legs 14 and base support 12. Three (3) set screws 102 are received within threaded holes 104 in the side plates 84 for adjusting the lateral positioning of thrust washer 100 with respect to each side support 84 to decrease or increase the side play between the lower leg portion 16 and the base support 12.

The lower pivot connection 32 is assembled by positioning the axle clamp 80 located at the lower end of the lower leg portion 26 onto the base bearing block 38 without the axle 62 inserted in the base bearing block 38. The axle 62 is inserted from one side through the hole 86 in one side support 84 of the axle clamp 80, through the base bearing block 38 including the set of bearings 60, and through hole 86 in the opposite side support 84. The bolts 90 are subsequently tightened effectively clamping the axle 62 in its operating position completing the assembly of the lower pivot connection 32.

Figure 2:
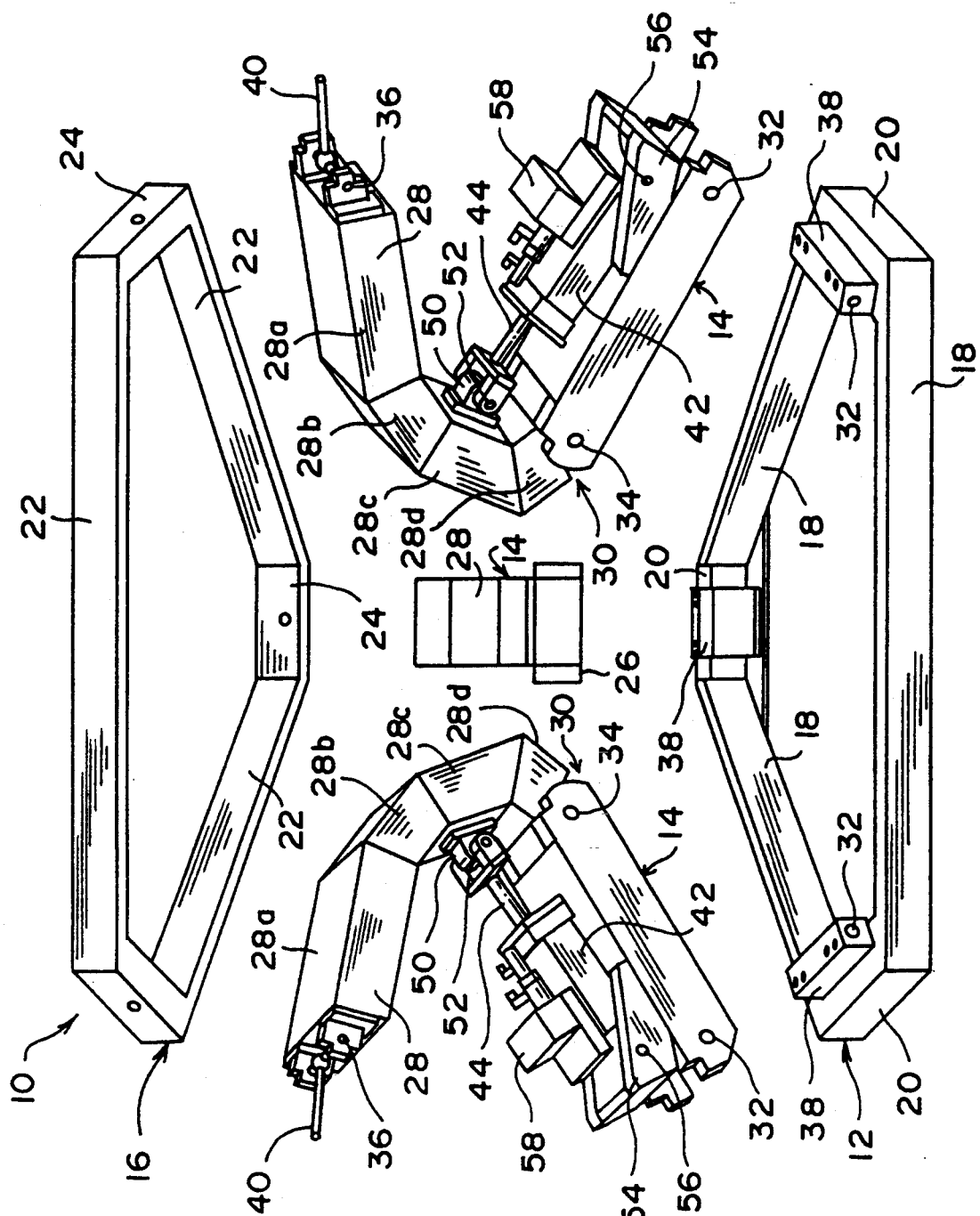
FIG. 2 is a front perspective view of the apparatus shown in FIG. 1, disassembled to illustrate the separate components thereof.

The lower bracket 56 is connected to the hydraulic actuator 42, as shown in FIGS. 1 and 2, and is shown in detail in FIGS. 5 and 6. The lower bracket 54 is defined by side plates 108 connected to the lower end of the lower leg portion 26, such as by welding. The side plates 108 are connected together by mounting plate 110 by welding and/or mechanical connector. A swivel bracket 112 including a swivel ball connector 114 received within a spherical bearing retainer 115 is mounted to the mounting plate 110 by four (4) bolts (not shown) passing through holes 116 in mounting plate 110 and holes 118 in swivel bracket 112. The spherical bearing retainer 115 is provided with a grease zerk fitting 119 for lubricating the swivel ball connector 114. The swivel bracket 112 is coupled to the cylinder end clevis 48, as shown in FIG. 1, defining the pivot connection 56.

The upper end of the lower leg portion 26 is connected to an axle clamp 120 defined by side supports 122 connected together by end plate 124, as shown in FIGS. 7 and 8. The end plate 124 is connected to the end of the rectangular cross-sectional tubing 82 such as by welding on four (4) sides thereof. The side supports 122 can be made of steel plates welded to the end plate 124.

The side supports 122 are each provided with a hole 126. A slit 128 is provided on each side support 122 extending from an end 130 to the hole 126 to provide a clamping arrangement. A threaded bolt 132 extends through a hole 134 in end portion 138 into a threaded hole 136 in end portion 140 allowing end portions 138 and 140 to be drawn together by tightening bolt 132 for clamping an axle 142 of the middle pivot connection 34, as shown in FIGS. 8 and 10, securely by the axle clamp 120. Thrust washers 144 are provided for supporting the axle 142 and prevent side play between the lower leg portion 26 and upper leg portion 28. Three (3) set screws 146 are received within threaded holes 148 for adjusting the lateral positioning of the thrust washer 144 with respect to the side support 122 to decrease or increase the side play between the upper and lower leg portions 26 and 28, respectively.

The lower end of the upper leg portion 28 is provided with a knee bearing block 150, as shown in FIGS. 9 and 10. The knee bearing block 150 is fitted with a pair of bearings 152 for supporting the axle 142 for substantially frictionless rotation. The knee bearing block 150 is also fitted with a pair of grease zerk fittings 154 for lubricating the bearings 152.

The upper leg portion 28 can be fabricated from rectangular cross-sectional tubing 156 connected to an end plate 158 such as by welding on four (4) sides thereof. The knee bearing block 150 is connected to the end of the upper leg portion 28 such as by welding the knee bearing block to the end plate 158.

The middle pivot connection 34 is assembled by positioning the axle clamp 120 located at the upper end of the lower leg portion 26 onto the knee bearing block 150 of the lower and upper leg portions 26 and 28, without the axle 142 inserted in the knee bearing block 150. The axle 142 is inserted from one side through hole 126 in one side support 122 of the axle clamp 120, through the knee bearing block 150 including the set of bearings 152, and through the hole 126 in the opposite side support 122. The bolts 132 are subsequently tightened effectively clamping the axle 142 in its operating position completing the assembly of the middle pivot connection 34.

The upper end of the upper leg portion 28 is provided with a top shaft clamp 160, as shown in FIGS. 11-14. The top shaft clamp 160 pivotably connects to a swivel bracket 162, which is pivotably connected to the motion platform 24 defining the upper pivot connection 36. The upper end of the upper leg portion 28 can be fabricated from rectangular cross-sectional tubing 164 connected to an end plate 166 such as by welding on four (4) sides thereof. The top shaft clamp 160 is connected to the upper end of the upper leg portion 28 by bolts 168 threaded into the end plate 166.

The swivel bracket 162 is defined by a spherical bearing retainer 170 fitted with a swivel ball connector 171. An axle 172 is provided with a threaded end 174 and nut 176. The spherical bearing retainer 170 is provided with a grease zerk fitting 178 for lubricating the swivel ball connector 171. The swivel bracket 162 is provided with a threaded end bolt 180 and nut 182 for securing the swivel bracket 162 to the box frame component 24 of the motion platform 16.

The top shaft clamp 160 is provided with side supports 182 each provided with a hole 184. A slit 186 is provided on each side support 182 extending from an end 188 to the hole 184 to provide a clamping arrangement. A threaded bolt 190 extends through a hole (not shown) in end portion 192 into a threaded hole (not shown) in end portion 194 allowing the end portions 192 and 194 to be drawn together by tightening bolt 190 for clamping the ends of the axle 172 securely by the top shaft clamp 160.

The upper pivot connection 36 is assembled by positioning the top shaft 160 located at the upper end of the upper leg portion 28 onto the swivel bracket 162 of the motion platform 16, without the axle 172 inserted in the swivel ball connector 171. The axle 172 is inserted from one side through the hole 184 in one side support 182 of the top shaft clamp 160, through the swivel ball connector 171, and through the hole 184 in the opposite side support 182. The bolts 190 are subsequently tightened effectively clamping the axle 172 in its operating position completing the assembly of the upper pivot connection 36.

The details of the connections of hydraulic actuator 42 with a leg 14 is shown in FIGS. 15-18. The cylinder end clevis 48 is defined by a pair of side supports 196 connected to an end support 198 such as by welding, as shown in FIG. 15. The end support 198 is attached to the hydraulic actuator 42.

The cylinder end clevis 48 is connected to the lower swivel bracket 112 defining the pivot connection 56. The lower swivel bracket 112, defined by the swivel ball connector 114 retained within the spherical bearing retainer 115, is positioned between the side supports 196 of the cylinder end clevis 112. A set of spacers 200 are provided for positioning the lower swivel bracket 112 within the cylinder end clevis 48 to prevent side play. A clevis pin 202 is inserted through holes 204 in the side supports 196, through the spacers 200, and through a hole in the swivel ball connector 114, and retained therein to complete the pivot connection 56.

The rod end clevis 46 is connected to the upper swivel bracket 50 defining the pivot connection 52, as shown in FIGS. 17 and 18. The rod end clevis 46 is defined by side supports 206 extending to end support 208, which is connected to the piston rod 44, as shown in FIGS. 1 and 2. The upper swivel bracket 50 is defined by side stabilizer plates 210 connected together by end plate 212. For example, the side stabilizer plates 210 are connected to the end plate 212 by machine screws 114. The end plate 212 of the upper swivel bracket 50 is provided with holes 215 for bolting the upper swivel bracket 50 to the upper leg portion 28. The side supports 210 are provided with bearings 216 for accommodating a clevis pin 218.

The upper swivel bracket 50 includes a swivel ball connector 220 received within a spherical bearing retainer 222 of a center bracket 224. The center bracket 224 is connected to the end plate 212, such as by welding. The spherical bearing retainer is provided with a grease zerk fitting 226 for lubricating the swivel ball connector 220. A set of spacers 228 are provided for positioning the center bracket 224 within the side supports 206 of the rod end clevis 46. The clevis pin 218 is inserted through the bearings 216, through the spacers 216, and through a hole in the swivel ball connector 220, and retained therein to complete the pivot connection 52.

Figure 19:
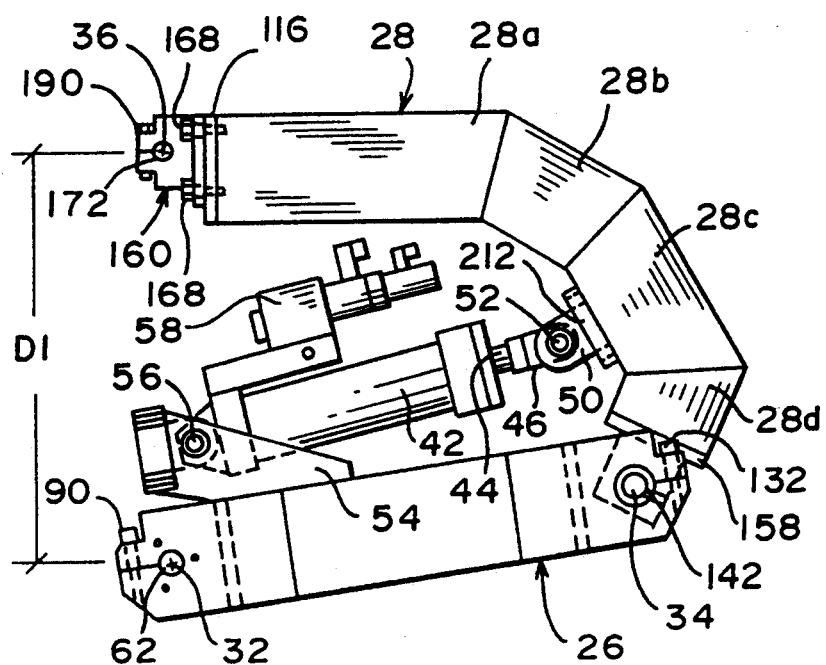
FIG. 19 is a side elevational view of a leg in the "closed" position.
Figure 20:
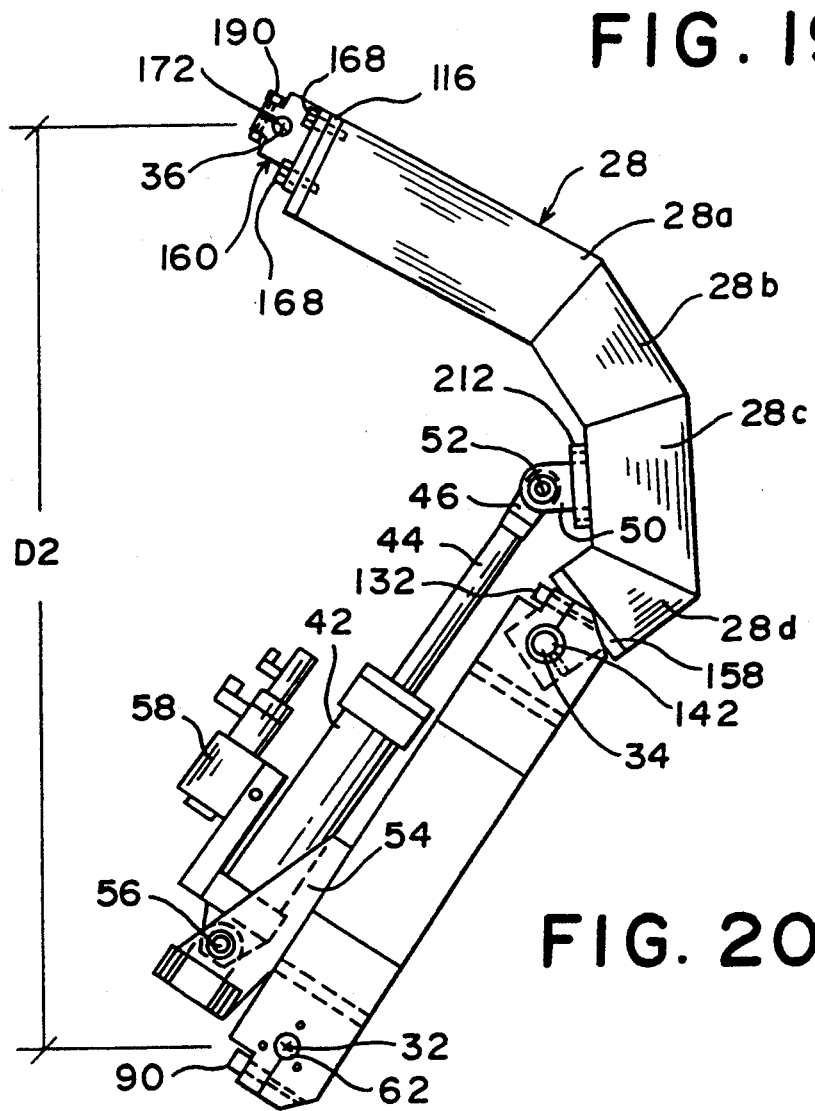
FIG. 20 is a side elevational view of a leg in the "open" position.
Figure 21:
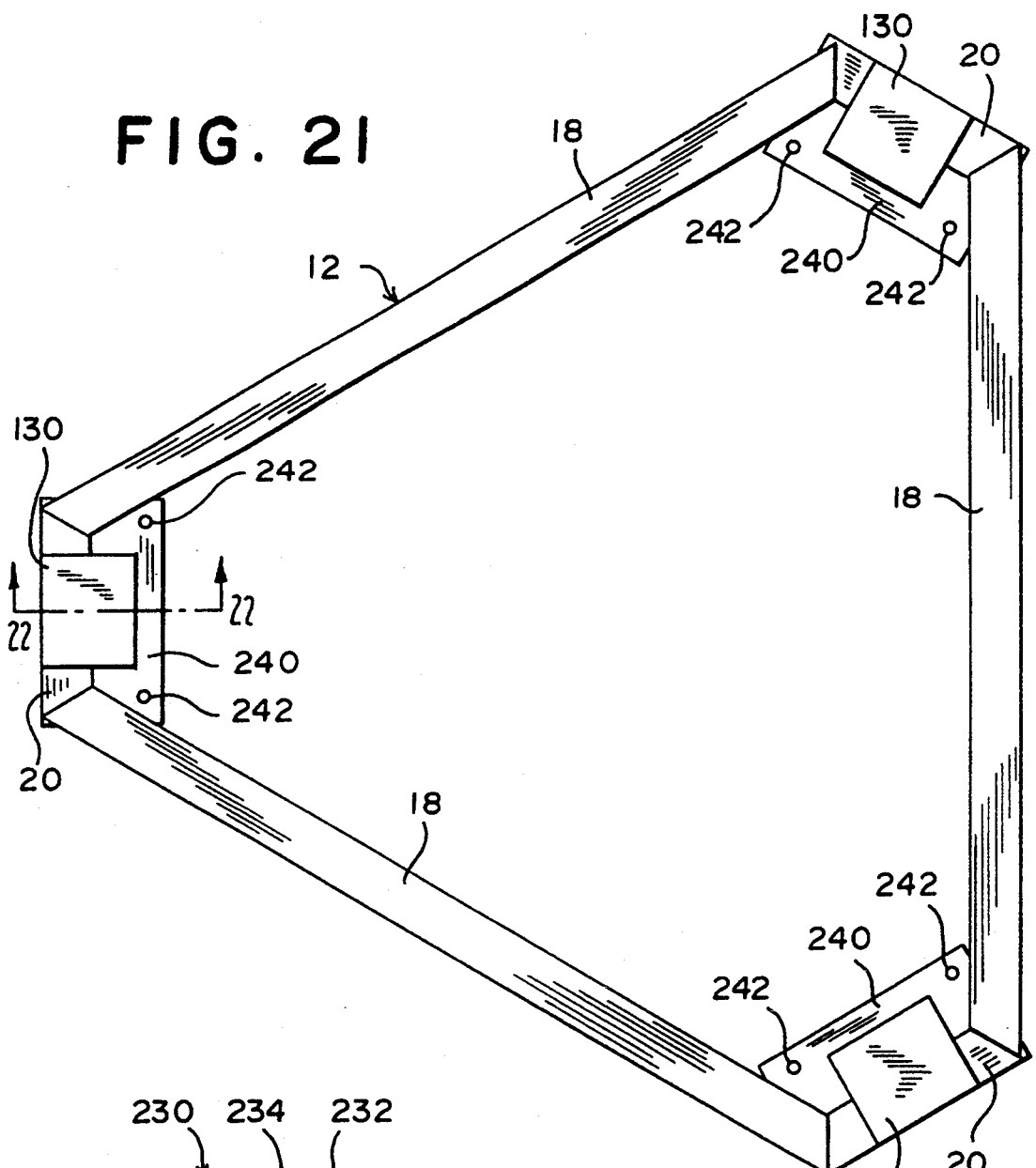
FIG. 21 is a top view of the base support frame and tank arrangement.

The above description refers to a single leg 14, however, the remaining two (2) or more legs 14 are of the same or similar construction. Detailed views of the assembled leg 14 is shown in FIGS. 19 and 20. In FIG. 19, the leg 14 is in the "closed" unextended position with a distance D1 separating the lower pivot connection 32 from the upper pivot connection 36. In FIG. 20, the leg 14 is in the "open" extended position with a distance D2 separating the lower pivot connection 32 from the upper pivot connection 36.

The details of the construction of the base support 12 and motion platform 16, are shown in FIGS. 21-24. The base support 12 is mainly constructed of rectangular cross-sectional steel tubing cut into longer box frame components 18 and shorter box frame connector components 20, assembled together such as by welding. In the preferred embodiment, the rectangular cross-sectional tubing is cut at 60 degree angles, when viewing the tubing sections from above, and then joined to form the triangular configuration of the base support 12.

Figure 22:
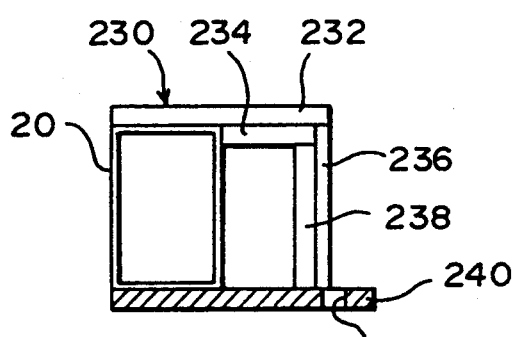
FIG. 22 is a side cross-sectional view of the base support, as indicated in FIG. 21.

The box frame components 20 are provided with bearing block supports 230. For example, the bearing block supports 230 can be constructed of top mounting plate 232, lower support plate 234, side support plate 236, brace plate 238, and lower base plate 240, as shown in FIG. 22. The top mounting plate 232 is provided with a plurality of threaded holes (not shown) for receiving bolts connecting the base bearing blocks 38 to the top mounting plates 232. The box frame connector 20, side support plate 236 and brace plate 238 are connected to lower base plate 240 such as by welding. The lower base plate 240 is provided with holes 242 for anchoring the base support 12 to a support such as the floor of a building.

Figure 23:
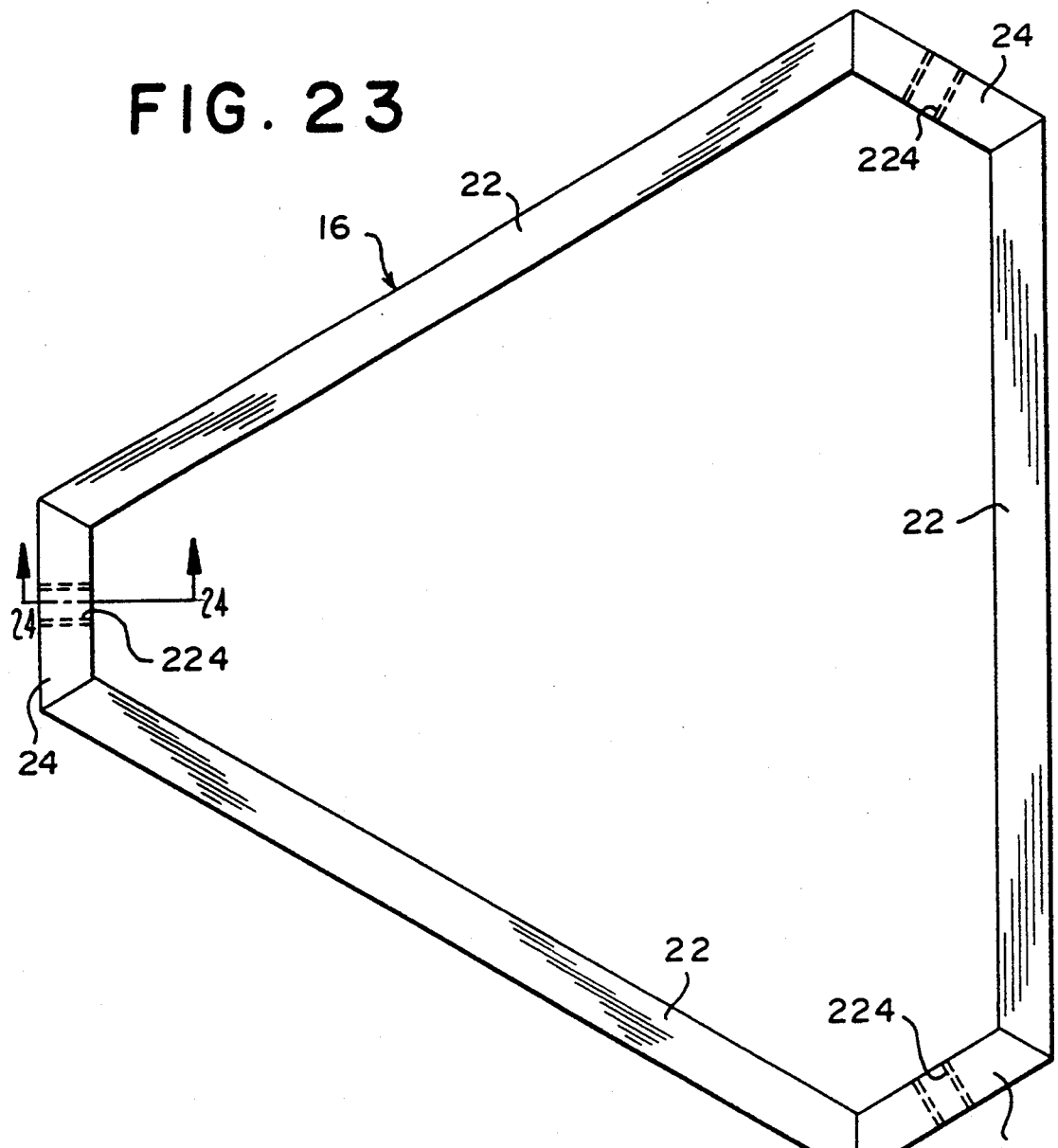
FIG. 23 is a top view of the motion platform.
Figure 24:
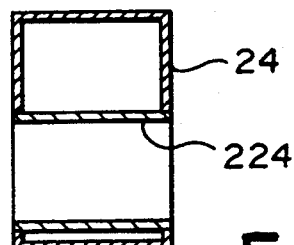
FIG. 24 is a cross-sectional view of the motion platform as indicated in FIG. 23.

The details of the motion platform 16 are shown in FIGS. 23 and 24. The motion platform 16 is constructed of rectangular cross-sectional tubing cut into longer box frame connector components 22 and shorter box frame connector components 24, preferably the same size and shape as box frame components 18 and box frame connector components 20 of the base support 12, to reduce the number of different parts in the overall apparatus to facilitate construction and assembly.

The shorter box frame connector components 24 are provided with sleeves 224 for receiving the threaded end bolts 180 of the swivel brackets 162 for connecting the upper leg portions 28 to the motion platform 16.

The embodiment of the motion simulator according to the present invention illustrated in the drawings can provide independently operable ranges of pitch, roll, and vertical translational motions up to the following ranges of values:

| | |
|---|---|
| Pitch | +,− 28 degrees; |
| Roll | +,− 28 degrees; and |
| Z-Heave | +,− 14 inches vertical translation. |

Hydraulic and Electrical Systems

The details of the hydraulic system will be described below and illustrated in FIGS. 25-28. The hydraulic actuators according to the present invention are preferably double acting type hydraulic actuators each provided with a valve manifold 300 and proportional servo valve 301, as shown in FIG. 26.

A hydraulic supply line 302 connects through an elbow 304 to a high pressure header/manifold 306 disposed within the base support 12, as shown in FIG. 25. The high pressure header/manifold 306 is connected to a tee 308, and a high pressure supply line 310 extends therefrom. The high pressure supply line 310 is connected to the valve manifold 300 of the actuator 42.

A low pressure return line 312 connects the valve manifold 300 to a tank/heat exchanger 314 defined by the box frame components 18 and box frame connector components 20 of the base support 12. An elbow 316 from the tank/heat exchanger 314 connects to a return line 318.

Three (3) accumulators 320 are attached to the box frame components 18 by bands 322 and brackets 324. Each accumulator 320 is provided with a ball valve 326 having a handle 328. The ball valve 326 is connected by a pressure line 330 and tee 332 to the high pressure header/manifold 306.

Figure 28:
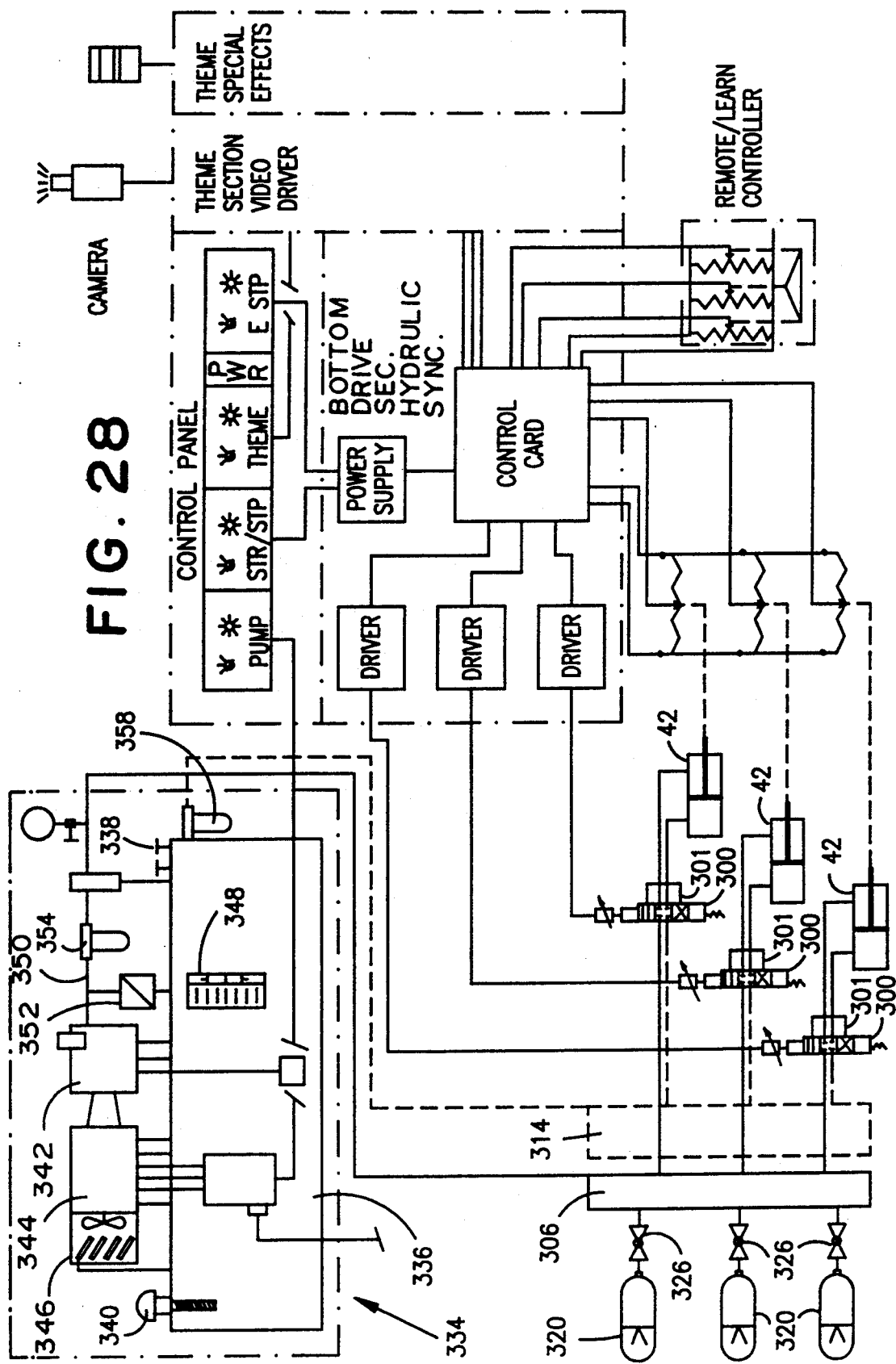
FIG. 28 is a schematic diagram of the combined hydraulic and electrical system installed with the motion simulator according to the present invention.

A schematic diagram of the hydraulic and electrical system is shown in FIG. 28. The hydraulic system includes a hydraulic fluid supply 334 comprising a storage tank 336, for example having a twenty (20) gallon capacity, with a fill port 338 and vent 340. The storage tank 336 is fitted with a hydraulic pump 342 driven by an electric motor 344. The electric motor 344 is coupled to a heat exchanger 346 for cooling the electric motor 344 during operation.

A combination temperature/level indicator 348 is provided on the side of the storage tank 336 for monitoring the temperature and level of the hydraulic fluid contained within the storage tank 336. The storage tank 336 is connected to supply line 350 via a pressure safety valve 352. A filtering device 354 and accumulator valve 356 are connected in the supply line 350 from the hydraulic pump 342. The storage tank 336 is equipped with a return filtering device 358.

The electrical control system comprises a solenoid driver, which activates the four (4) - way valve spool, a valve power amplifier, a valve linear variable differential amplifier (LVDT), and a signal conditioning amplifier section for each independent leg system.

Position commands from ±1 vdc to ±10 vdc are amplified, filtered and compensated in the signal conditioning amplifier. All custom operating characteristics such as position feedback control, switching, safety, tuning and calibration are handled in this amplifier section for all independent motion actuating systems. This signal conditioning section provides a ±10 vdc output as input to each power amplifier section.

Input from the respective signal conditioning amplifiers stimulates each power amplifier. The valve power amplifiers operate in follower mode to provide the necessary valve current to energize the valve coils in direct proportion to the input signal.

The position of the spool valve is monitored by an LVDT, which provides closed-loop control (inner loop) of the actual valve position. The actual valve position is compared to the power amplifier command and nulled for precise and stable control.

Typical operation utilizes signal commands generated from computer programs developed in synchronization with visual programs. Computer commands are conveyed to the analog system via D/A conversion. A remote controller (optional Joy-Stick Controller) can provide an artificial signal to drive the motion system under manual control. Similarly, a wave generator (optional equipment) can provide artificial input for repetitive demonstration purposes.

Operation

Main power is switched on from the master control panel. This energizes the primary power buss for operating and controlling all individual peripheral systems. Low voltage control power is switched on from the main panel with verification via panel light. The main hydraulic pump is energized from the main panel. Verification of pump operating pressure is obtained by manually observing the pressure indicator located at the pumping unit. Full pressure, including accumulator charging, will occur in approximately 60 seconds after initial start-up.

Normal operation is initiated form a settled (at rest) position by the enable/disable switch located on the master control panel switched to the disable position. After all control position input signal references are verified, the enable/disable switch is switched to the enable position. Control is now transferred to computer input command or optional manual controller (when provided). All normal operation is by computer command.

The computer's first command will slowly bring the motion system to full erect condition where all independent legs are at mid-position. All simulation and control is referenced to the mid-stroke position. Typical operation will necessitate the simultaneous movement of all motion axes (synergistic action) to achieve the desired degree of action normally associated with quality simulation. After program conclusion, the simulator is powered to settled (at-rest) position and manually disabled via enable/disable switch. This allows for a monitored safe condition for passenger egress/ingress.

In case of emergency shut down for cautionary or safety purposes, the motion platform and hydraulic system are designed to safely settle to an at-rest position in anyone of three modes including: 1) enable/disable switch in disable mode—controls circuitry and pump motor still energized; 2) low voltage power supply de-energized—control circuitry de-energized, pump motor still energized; and 3) main power off—all systems de-energized and accumulators dump within 10 seconds.

Figure 29:
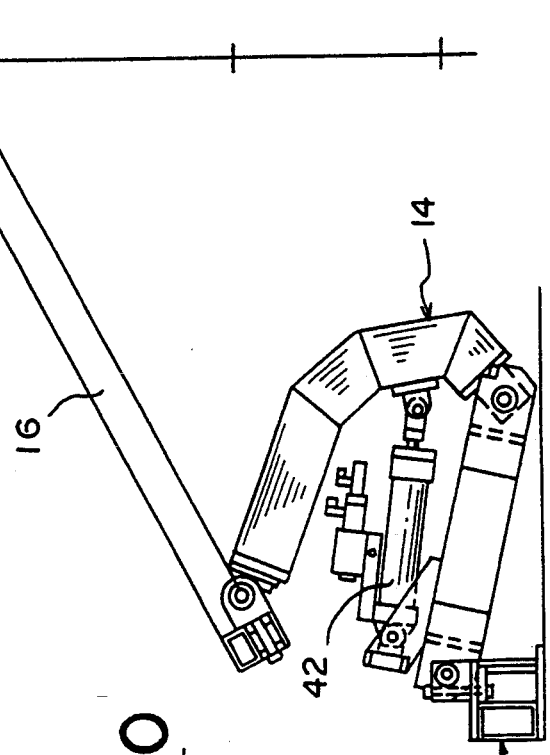
FIG. 29 is a diagrammatic side elevational view of the motion simulator with the motion platform in a "raised" tilted position.
Figure 30:
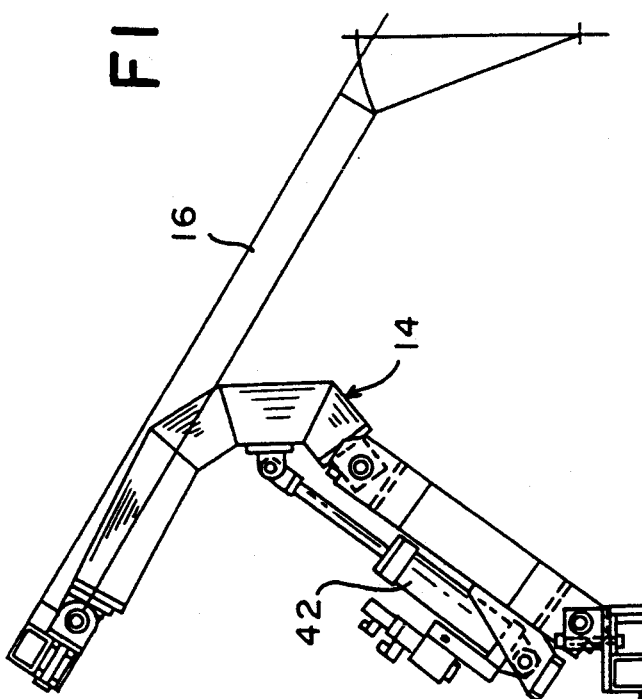
FIG. 30 is a side elevational view of the motion simulator with the motion platform in a lowered level position.
Figure 31:
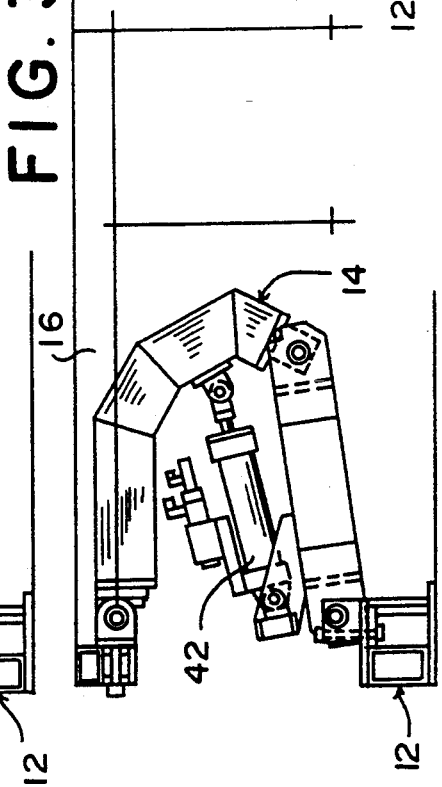
FIG. 31 is a side elevational view of the motion simulator with the motion platform in a lowered tilted position.

The various modes of operation of the motion platform are shown in FIGS. 29–31. The configurations of the leg 14 are shown in the different figures.

Attachments

Figure 32:
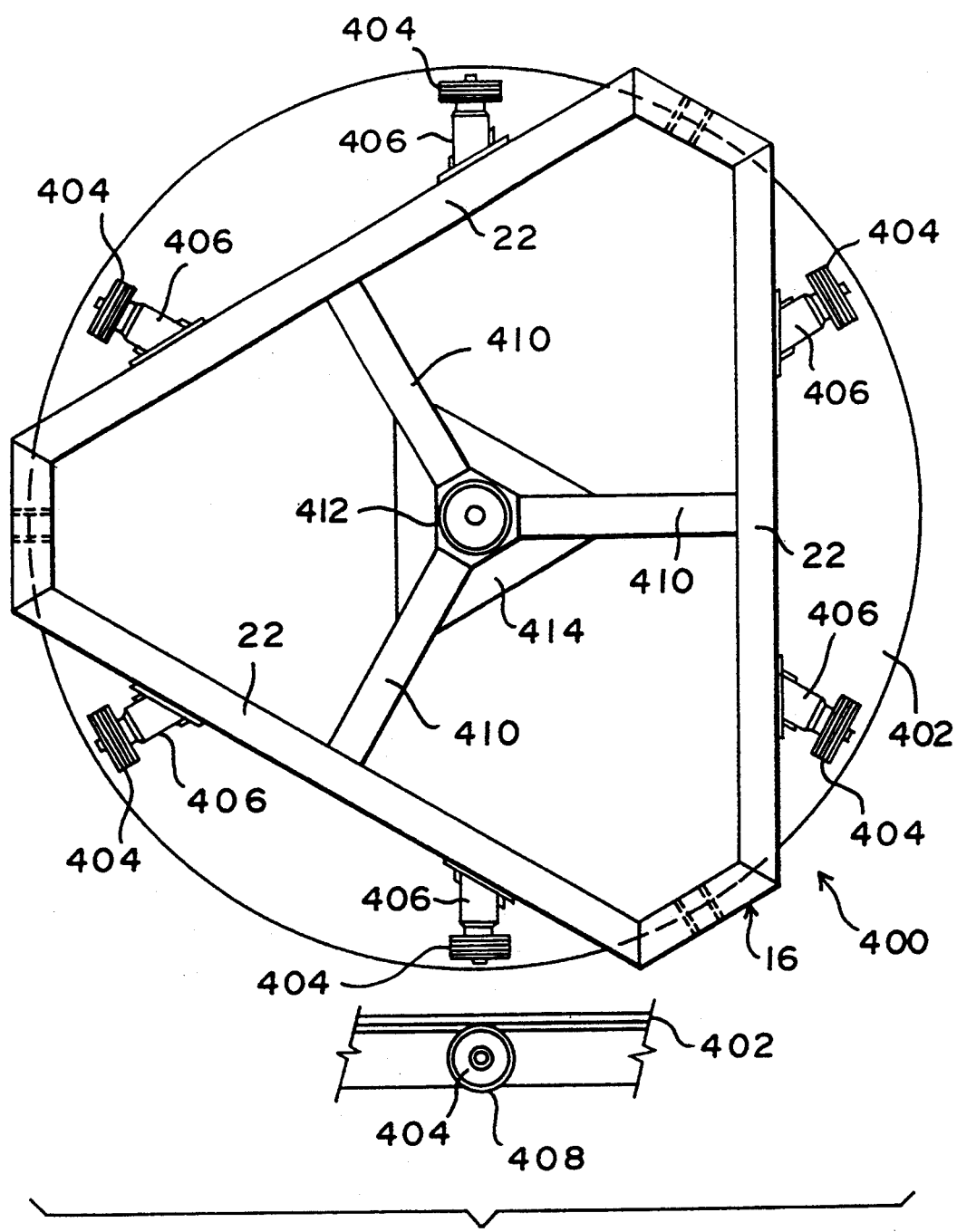
FIG. 32 is a top view of a rotary (Yaw) attachment.
Figure 33:
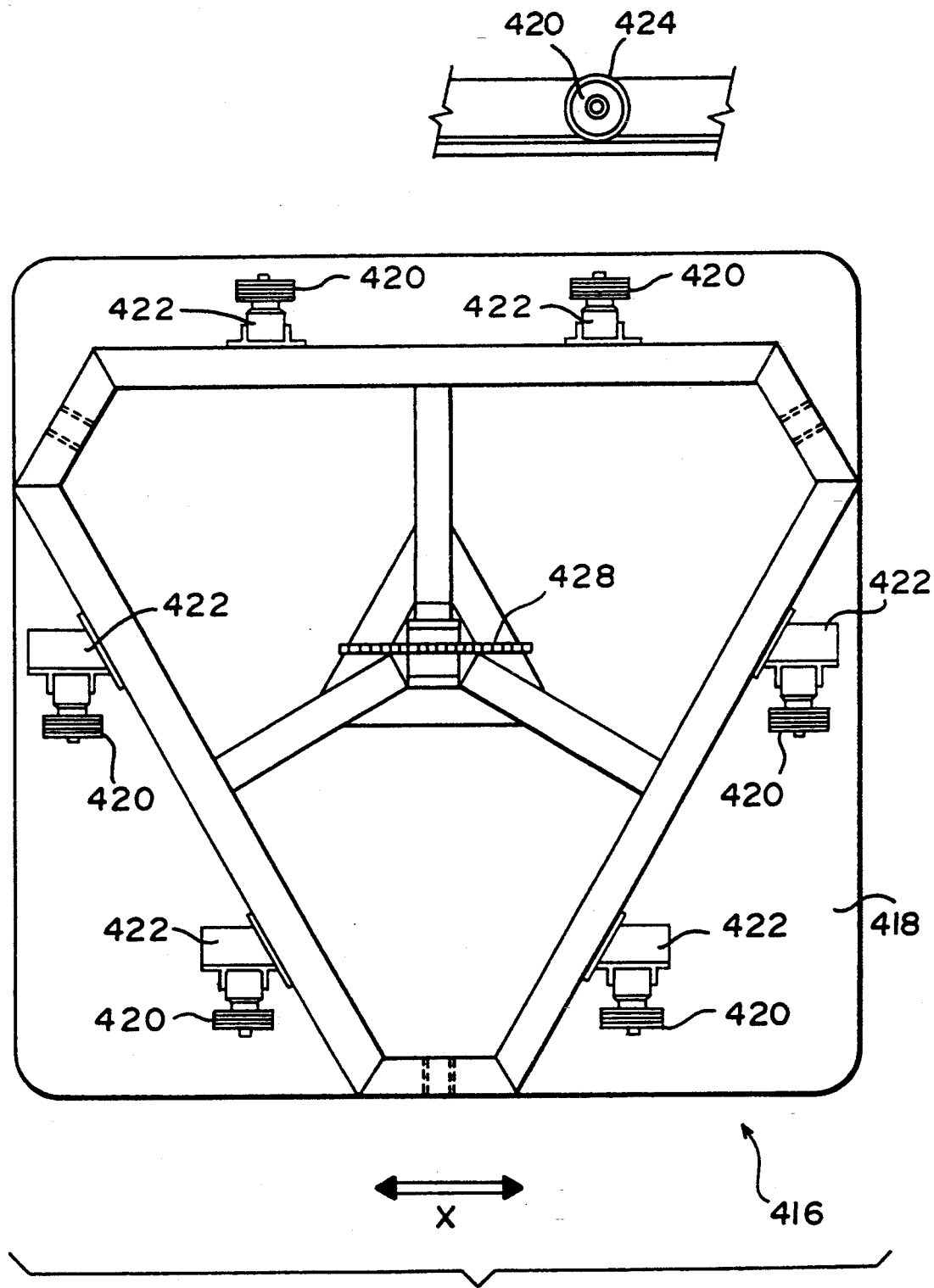
FIG. 33 is a top view of an X-axis translational attachment.
Figure 34:
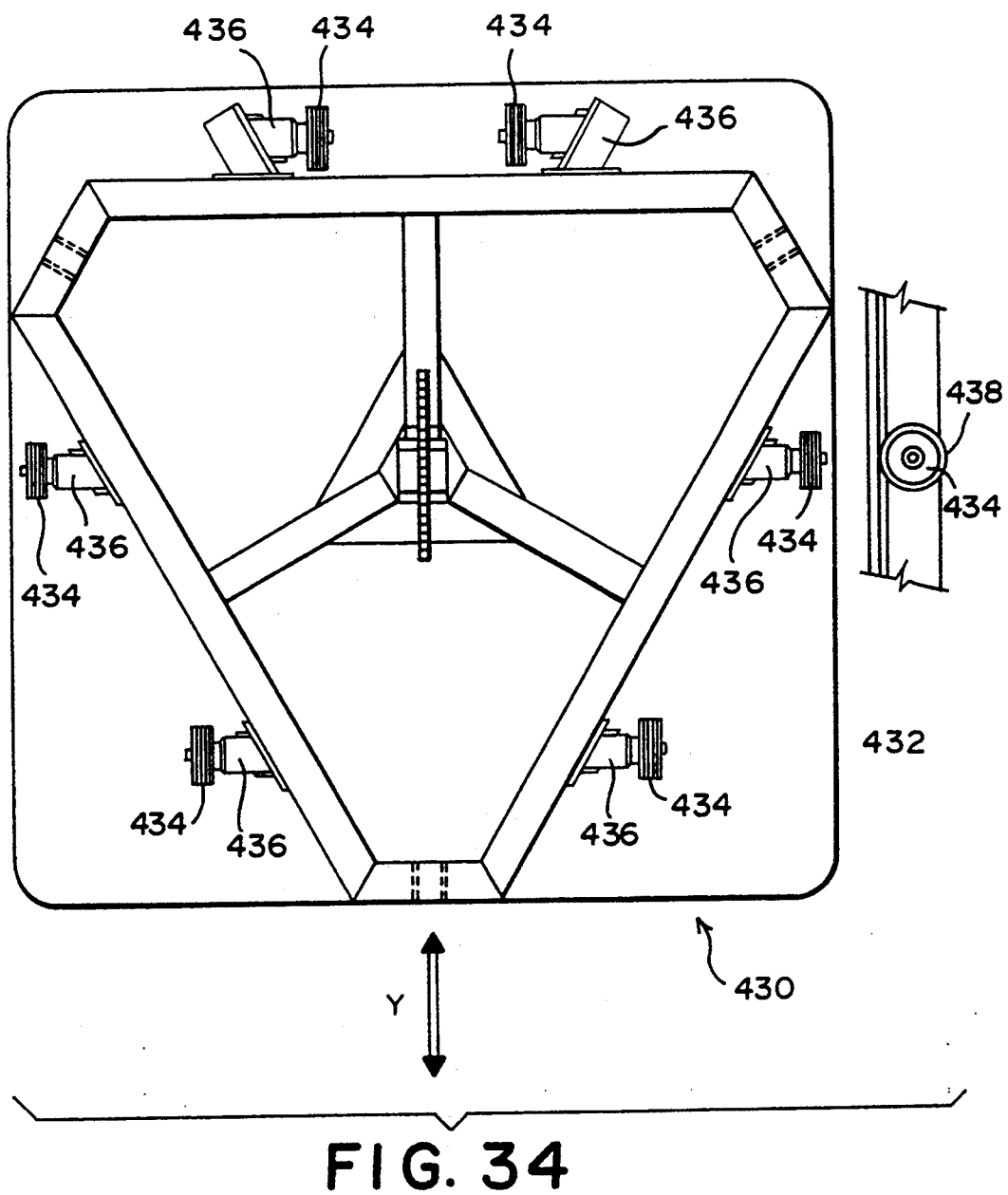
FIG. 34 is a top view of a Y-axis translational attachment.

Three (3) different attachments to the motion simulator according to the present invention are shown in FIGS. 32–34.

A rotary (Yaw) attachment 400 is shown in FIG. 32. The attachment 400 comprises a circular platform 402 movably supported for rotary (Yaw) movement in the O (theta) - axis direction by a plurality of rollers 404 support for rotary movement and driven by roller bracket motors 406. Each support roller 404 is provided with a rubber or synthetic cover 408 for producing frictional contact with the circular platform 402. In the configuration shown, six (6) independent roller bracket motors 406 support the circular platform 402 from underneath. The roller bracket motors 406 are controlled and synchronized to move the circular platform in a clockwise or counterclockwise motion at different selected rates.

The motion platform is provided with radial supports extending from a center rotary hub 412 to the box frame components 22. The center rotary hub 412 is connected to the bottom of the circular platform 402.

An X-axis translation attachment 416 is shown in FIG. 33. The attachment 416 comprises a substantially rectangular platform 418 movably supported for translational movement in the X-axis direction by a plurality of support rollers 420 supported for rotary movement and driven by roller bracket motors 422.

Each support roller 420 is provided with a rubber or synthetic cover 424 for producing frictional contact with the rectangular platform 418. In the configuration shown, six (6) independent support rollers 420 support the platform 418 form underneath. A linear guide 428 is provided at the center to direct the path of movement of the rectangular platform 418.

A Y-axis translation attachment 430 is shown in FIG. 34. The attachment 430 comprises a substantially rectangular platform 432 movably supported for translation movement in the Y-axis direction by a plurality of support rollers 434 supported for rotary movement and driven by roller bracket motors 436.

Each support roller 434 is provided with a rubber or synthetic cover 438 for producing frictional contact with the rectangular platform 432. In the configuration shown, six (6) independent support rollers 434 support the rectangular platform 432 from underneath.

A motion simulator according to the present invention provided with the above described attachments can provide the following excursion limits:

| | |
|---|---|
| X | +,− 10 inches lateral translation; |
| Y | +,− 10 inches lateral translation; and |
| Yaw | +,− 180 degrees. |

I claim:
1. A motion simulator apparatus, comprising:
a base support;
a plurality of hinged legs connected to said base support;

a motion platform connected to said legs at three separate points defining a plane; and an actuator for moving said platform relative to said base; wherein said actuator is connected to one or more of said legs; wherein one of said legs is defined by leg portions hinged together with said actuator connected between said leg portions to fold and unfold said leg about a knee to move said motion platform relative to said support.

2. An apparatus according to claim 1, wherein remaining legs of the apparatus are similarly constructed with leg portions and separate actuator to define independent leg actuators for moving the motion platform relative to said base support.

3. An apparatus according to claim 1, wherein said base support is constructed with a tubular collar to which said legs are connected.

4. An apparatus according to claim 1, wherein said motion platform is constructed with a tubular collar to which said legs are connected.

5. An apparatus according to claim 3, wherein said motion platform is constructed with a tubular collar to which said legs are connected.

6. An apparatus according to claim 5, wherein one of said legs is defined by leg portions hinged together with said actuator connected between said leg portions to fold and unfold said leg to move said motion platform relative to said support.

7. An apparatus according to claim 6, wherein remaining legs of the apparatus are similar constructed with leg portions and separate actuator to define independent leg actuators for moving said motion platform relative to said base support.

8. An apparatus according to claim 5, wherein said tubular collars of said base support and platform are constructed from rectangular cross-section tubing.

9. An apparatus according to claim 1, wherein each leg portion is constructed from rectangular tubing sections.

10. An apparatus according to claim 9, wherein said tubular sections are fabricated from preformed/prewelded rectangular steel tubing.

11. An apparatus according to claim 9, wherein each end of said actuator is connected to a leg portion by an bearing arrangement connected to said tubular leg portions.

12. An apparatus according to claim 1, wherein said leg portions are substantially equal in length.

13. An apparatus according to claim 9, wherein said leg portions are hingedly connected together for pivotal movement by a bearing arrangement located substantially at ends of said leg portions.

14. An apparatus according to claim 13, wherein said leg portions are pivotally connected at their opposite respective ends to said base support and said platform.

15. An apparatus according to claim 1, wherein said pivotal connections between said leg portions, and between said legs and said base support and said motion platform comprise plain spherical bearings.

16. A motion simulator apparatus, comprising:
a base support;
a plurality of hinged legs connected to said base support in a triangular arrangement;
a motion platform connected to said legs at three separate points defining a plane in a triangular arrangement; and wherein each of said legs is defined by leg portions hinged together with said actuator connected between said leg portions to fold and unfold said leg about a knee to move said motion platform relative to said support.

17. A motion simulator according to claim 16, including optional additional attachments that can be provided to the motion simulator to accommodate additional degrees of motion as follows:

| Yaw | +,− 180 degrees; |
| X | +,− 10 inches lateral translation; and |
| Y | +,− 10 inches lateral translation. |

* * * * *